United States Patent
Chen et al.

(10) Patent No.: US 11,924,810 B2
(45) Date of Patent: Mar. 5, 2024

(54) NARROWBAND MANAGEMENT FOR MACHINE TYPE COMMUNICATIONS

(71) Applicant: QUALCOMM Incorporated, San Diego, CA (US)

(72) Inventors: Wanshi Chen, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 16/822,842

(22) Filed: Mar. 18, 2020

(65) Prior Publication Data

US 2020/0221425 A1    Jul. 9, 2020

Related U.S. Application Data

(62) Division of application No. 15/052,471, filed on Feb. 24, 2016, now Pat. No. 10,681,676.

(Continued)

(51) Int. Cl.
*H04W 72/04* (2023.01)
*H04L 5/00* (2006.01)
*H04W 4/70* (2018.01)

(52) U.S. Cl.
CPC .......... *H04W 72/04* (2013.01); *H04L 5/0039* (2013.01); *H04W 4/70* (2018.02); *H04L 5/0007* (2013.01); *H04L 5/0044* (2013.01); *H04L 5/0064* (2013.01)

(58) Field of Classification Search
CPC .... H04W 72/04; H04L 5/0039; H04L 5/0064; H04L 5/0048
See application file for complete search history.

(56) References Cited

U.S. PATENT DOCUMENTS 9,241,287 B2    1/2016  Montojo et al.
9,673,952 B2    6/2017  Chen et al.
(Continued)

FOREIGN PATENT DOCUMENTS

CN    104321985 A    1/2015
JP    2009524976 A   7/2009
(Continued)

OTHER PUBLICATIONS

Ericsson: "Support of Narrowband Operation for MTC [online]", 3GPP TSG-RAN WG4#74, Internet, URL:http://www.3gpp.org/ftp/tsg_ran/WG4_Radio/TSGR4_74/Docs/R4-150661.zip, Feb. 2, 2015, R4-150661, 4 pages.

(Continued)

*Primary Examiner* — Raj Jain
(74) *Attorney, Agent, or Firm* — Dalei Dong; Harrity & Harrity, LLP

(57) ABSTRACT

Certain aspects of the present disclosure generally relate to wireless communications, and more specifically to managing narrowband regions of system bandwidths for devices with limited communications resources, such as machine type communication(s) (MTC) devices and enhanced MTC (eMTC) devices. An example method generally includes determining a set of downlink (DL) narrowband regions partitioned from a DL system bandwidth, determining a set of uplink (UL) narrowband regions partitioned from an UL system bandwidth, determining a mapping between the set of DL narrowband regions and the set of UL narrowband regions, and communicating with at least a base station (BS) using at least one of the mapped narrowband regions.

13 Claims, 17 Drawing Sheets

Related U.S. Application Data

(60) Provisional application No. 62/120,861, filed on Feb. 25, 2015.

(56) References Cited

U.S. PATENT DOCUMENTS

| | | | | |
|---|---|---|---|---|
| 10,681,676 | B2* | 6/2020 | Chen | H04W 4/70 |
| 2009/0181687 | A1* | 7/2009 | Tiirola | H04L 5/0048 |
| | | | | 455/507 |
| 2011/0110401 | A1* | 5/2011 | Leong | H04B 7/18515 |
| | | | | 375/211 |
| 2011/0286411 | A1 | 11/2011 | Kim et al. | |
| 2012/0057449 | A1 | 3/2012 | Takaoka et al. | |
| 2013/0077582 | A1 | 3/2013 | Kim et al. | |
| 2013/0272215 | A1 | 10/2013 | Khoryaev et al. | |
| 2013/0322363 | A1 | 12/2013 | Chen et al. | |
| 2015/0256403 | A1 | 9/2015 | Li et al. | |
| 2016/0081084 | A1 | 3/2016 | Blankenship et al. | |
| 2016/0127936 | A1 | 5/2016 | Chatterjee et al. | |
| 2016/0249327 | A1 | 8/2016 | Chen et al. | |
| 2017/0290016 | A1 | 10/2017 | Yi et al. | |
| 2017/0311232 | A1* | 10/2017 | Yi | H04L 5/0053 |
| 2018/0019855 | A1 | 1/2018 | Zhang et al. | |
| 2018/0331800 | A1* | 11/2018 | Gao | H04L 5/0012 |
| 2019/0289630 | A1 | 9/2019 | Kim et al. | |
| 2020/0221425 | A1* | 7/2020 | Chen | H04W 4/70 |

FOREIGN PATENT DOCUMENTS

| | | |
|---|---|---|
| WO | WO-2007091795 A1 | 8/2007 |
| WO | WO-2010118382 A1 | 10/2010 |
| WO | WO-2013040221 A2 | 3/2013 |

OTHER PUBLICATIONS

International Preliminary Report on Patentability—PCT/US2016/019527, The International Bureau of WIPO—Geneva, Switzerland, dated Aug. 29, 2017.
International Search Report and Written Opinion—PCT/US2016/019527—ISA/EPO—dated Aug. 2, 2016.
Lenovo: "DL Physical Control Channels for MTC [online]", 3GPP TSG-RAN WG1#80, Internet URL:http://www.3gpp.org/ftp/tsg_ran/WG1_RL1/TSGR1_80/Docs/R1-150550.zip, Jan. 30, 2015, R1-150550, 5 pages.
Microsoft Corporation : "Consideration on UE Complexity Reduction", 3GPP TSG-RAN WG1 Meeting #78bis, 3GPP Draft; R1-144246 UE Complexity Reduction—V2, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014 Oct. 5, 2014 (Oct. 5, 2014), 5 Pages, XP050875514, Retrieved from the Internet: URL:http:/www.3gpp.org/ftp/Meetings_3GPP_SYNC/RAN1/Doc [retrieved on Oct. 5, 2014] figure 1 p. 1-p. 2.
Partial International Search Report—PCT/US2016/019527—ISA/EPO—dated May 23, 2016.
Qualcomm Incorporated : "Physical Data Channels," 3GPP Draft; R1-150464 Physical Data Channels, 3rd Generation Partnership Project (3GPP), Mobile Competence Centre ; 650, Route Des Lucioles ; F-06921 Sophia-Antipolis Cedex ; France vol. RAN WG1, No. Athens, Greece; Feb. 9, 2015-Feb. 13, 2015 Feb. 8, 2015 (Feb. 8, 2015), XP050933672, Retrieved from the Internet: URL:http://www.3gpp.org/ftp/Meetings_3GPP_ SYNC/RAN1/Docs/ [retrieved on Feb. 8, 2015].
Samsung: "RACH Enhancements for Rel-13 MTC [online]", 3GPP TSG-RAN WG2#89, Internet, URL:http://www.3gpp.org/ftp/tsg_ran/WG2_RL2/TSGR2_89/Docs/R2-150501.zip, Jan. 31, 2015, R2-150501, 5 pages.
ZTE: "Bandwidth reduction for low complexity UEs", 3GPP draft; R1-144815, 3rd Generation Partnership Project (3GPP), Mobile Competence Centre ; 650, Route Des Lucioles ; F-06921 Sophia-Antipolis Cedex; France vol. RAN WG1, No. San Francisco, US; Nov. 17, 2014-Nov. 21, 2014 D6379817 Nov. 2014 (Nov. 17, 2014), pp. 1-4, XP050875881, Retrieved from the Internet: http://www.3gpp.org/ftp/Meetings_3GPP_SYNC/RAN1/Docs/ [retrieved on Nov. 17, 2014] p. 1.
ZTE: "Considerations on Physical Data Channels for MTC Enhancement", 3GPP draft; R1-150143-FINAL, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 9, 2015-Feb. 138, 2015 Feb. 2015 (Feb. 8, 2015), pp. 1-7, XP050933357, Retrieved from the Internet: http://www.3gpp.org/ftp/Meetings 3GPP SYNC/RAN1/Docs/ [retrieved on Feb. 8, 2015] figure 1 p. 1-p. 2.

* cited by examiner

NARROWBAND MANAGEMENT FOR MACHINE TYPE COMMUNICATIONS

CROSS-REFERENCE TO RELATED APPLICATIONS

The present application for patent is a divisional application of U.S. patent application Ser. No. 15/052,471, filed Feb. 24, 2016, which claims priority to U.S. Provisional Application No. 62/120,861, filed Feb. 25, 2015, which are both assigned to the assignee of the present application and hereby expressly incorporated by reference herein in their entireties.

BACKGROUND

I. Field of the Invention

Certain aspects of the present disclosure generally relate to wireless communications, and more specifically to managing narrowband regions in systems utilizing devices with limited communications resources, such as machine type communication(s) (MTC) devices and enhanced or evolved MTC (eMTC) devices.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communications (MTC) UEs, which may include remote devices, that may communicate with a base station, another remote device, or some other entity. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (B S). The method generally includes determining a set of downlink (DL) narrowband regions partitioned from a DL system bandwidth, determining a set of uplink (UL) narrowband regions partitioned from an UL system bandwidth, determining a mapping between the set of DL narrowband regions and the set of UL narrowband regions, and communicating with at least a user equipment (UE) using at least one of the mapped narrowband regions.

Certain aspects of the present disclosure provide an apparatus for wireless communications by a base station (B S). The apparatus generally includes at least one processor configured to determine a set of downlink (DL) narrowband regions partitioned from a DL system bandwidth, determine a set of uplink (UL) narrowband regions partitioned from an UL system bandwidth, determine a mapping between the set of DL narrowband regions and the set of UL narrowband regions, and communicate with at least a user equipment (UE) using at least one of the mapped narrowband regions, and memory coupled to the at least one processor.

Certain aspects of the present disclosure provide an apparatus for wireless communications by a base station (BS). The apparatus generally includes means for determining a set of downlink (DL) narrowband regions partitioned from a DL system bandwidth, means for determining a set of uplink (UL) narrowband regions partitioned from an UL system bandwidth, means for determining a mapping between the set of DL narrowband regions and the set of UL narrowband regions, and means for communicating with at least a user equipment (UE) using at least one of the mapped narrowband regions.

Certain aspects of the present disclosure provide a computer-readable medium for wireless communications by a base station (BS). The computer-readable medium generally includes code to determine a set of downlink (DL) narrowband regions partitioned from a DL system bandwidth, code to determine a set of uplink (UL) narrowband regions partitioned from an UL system bandwidth, code to determine a mapping between the set of DL narrowband regions and the set of UL narrowband regions, and code to communicate with at least a user equipment (UE) using at least one of the mapped narrowband regions.

Certain aspects of the present disclosure provide a method for wireless communications by a BS. The method generally includes determining a plurality of narrowband regions partitioned from system bandwidth, the plurality of narrowband regions comprising one or more DL narrowband regions and one or more UL narrowband regions for communicating with a UE, identifying a set of resources in at least one of the one or more DL narrowband regions or the one or more UL narrowband regions unavailable for the UE, providing an indication of the identified set of resources to the UE, and communicating with the UE using the narrowband regions.

Certain aspects of the present disclosure provide an apparatus for wireless communications by a BS. The apparatus generally includes at least one processor configured to determine a plurality of narrowband regions partitioned from system bandwidth, the plurality of narrowband regions comprising one or more DL narrowband regions and one or more UL narrowband regions for communicating with a UE, identify a set of resources in at least one of the one or more DL narrowband regions or the one or more UL narrowband regions unavailable for the UE, provide an indication of the identified set of resources to the UE, and communicate with the UE using the narrowband regions, and memory coupled to the at least one processor.

Certain aspects of the present disclosure provide an apparatus for wireless communications by a BS. The apparatus generally includes means for determining a plurality of narrowband regions partitioned from system bandwidth, the plurality of narrowband regions comprising one or more DL narrowband regions and one or more UL narrowband regions for communicating with a UE, means for identifying a set of resources in at least one of the one or more DL narrowband regions or the one or more UL narrowband regions unavailable for the UE, means for providing an indication of the identified set of resources to the UE, and means for communicating with the UE using the narrowband regions.

Certain aspects of the present disclosure provide a computer-readable medium for wireless communications by a BS. The computer-readable medium generally includes code to determine a plurality of narrowband regions partitioned from system bandwidth, the plurality of narrowband regions comprising one or more DL narrowband regions and one or more UL narrowband regions for communicating with a UE, code to identify a set of resources in at least one of the one or more DL narrowband regions or the one or more UL narrowband regions unavailable for the UE, code to provide an indication of the identified set of resources to the UE, and code to communicate with the UE using the narrowband regions.

Certain aspects of the present disclosure provide a method for wireless communications by a BS. The method generally includes determining a plurality of narrowband regions partitioned from system bandwidth, the plurality of narrowband regions comprising one or more DL narrowband regions and one or more UL narrowband regions for communicating with a UE, determining resources, within at least one of the one or more UL narrowband regions, for transmission of sounding reference signals (SRS) by the UE, and communicating with the UE using the narrowband regions, wherein the communicating comprises receiving SRS on the determined resources.

Certain aspects of the present disclosure provide an apparatus for wireless communications by a BS. The apparatus generally includes at least one processor configured to determine a plurality of narrowband regions partitioned from system bandwidth, the plurality of narrowband regions comprising one or more DL narrowband regions and one or more UL narrowband regions for communicating with a UE, determine resources, within at least one of the one or more UL narrowband regions, for transmission of sounding reference signals (SRS) by the UE, and communicate with the UE using the narrowband regions, wherein the communicating comprises receiving SRS on the determined resources, and memory coupled to the at least one processor.

Certain aspects of the present disclosure provide an apparatus for wireless communications by a BS. The apparatus generally includes means for determining a plurality of narrowband regions partitioned from system bandwidth, the plurality of narrowband regions comprising one or more DL narrowband regions and one or more UL narrowband regions for communicating with a UE, means for determining resources, within at least one of the one or more UL narrowband regions, for transmission of sounding reference signals (SRS) by the UE, and means for communicating with the UE using the narrowband regions, wherein the communicating comprises receiving SRS on the determined resources.

Certain aspects of the present disclosure provide a computer-readable medium for wireless communications by a BS. The computer-readable medium generally includes code to determine a plurality of narrowband regions partitioned from system bandwidth, the plurality of narrowband regions comprising one or more DL narrowband regions and one or more UL narrowband regions for communicating with a UE, code to determine resources, within at least one of the one or more UL narrowband regions, for transmission of sounding reference signals (SRS) by the UE, and code to communicate with the UE using the narrowband regions, wherein the communicating comprises receiving SRS on the determined resources.

Certain aspects of the present disclosure provide a method for wireless communications by a UE. The method generally includes determining a set of DL narrowband regions partitioned from a DL system bandwidth, determining a set of UL narrowband regions partitioned from an UL system bandwidth, determining a mapping between the set of DL narrowband regions and the set of UL narrowband regions, and communicating with a BS using at least one of the mapped narrowband regions.

Certain aspects of the present disclosure provide an apparatus for wireless communications by a UE. The apparatus generally includes at least one processor configured to determine a set of DL narrowband regions partitioned from a DL system bandwidth, determine a set of UL narrowband regions partitioned from an UL system bandwidth, determine a mapping between the set of DL narrowband regions and the set of UL narrowband regions, and communicate with a BS using at least one of the mapped narrowband regions, and memory coupled to the at least one processor.

Certain aspects of the present disclosure provide an apparatus for wireless communications by a UE. The apparatus generally includes means for determining a set of DL narrowband regions partitioned from a DL system bandwidth, means for determining a set of UL narrowband regions partitioned from an UL system bandwidth, means for determining a mapping between the set of DL narrowband regions and the set of UL narrowband regions, and means for communicating with a BS using at least one of the mapped narrowband regions.

Certain aspects of the present disclosure provide a computer-readable medium for wireless communications by a UE. The computer-readable medium generally includes code to determine a set of DL narrowband regions partitioned from a DL system bandwidth, code to determine a set of UL narrowband regions partitioned from an UL system bandwidth, code to determine a mapping between the set of DL narrowband regions and the set of UL narrowband regions, and code to communicate with a BS using at least one of the mapped narrowband regions.

Certain aspects of the present disclosure provide a method for wireless communications by a UE. The method generally includes determining a plurality of narrowband regions partitioned from system bandwidth, the plurality of narrowband regions comprising one or more DL narrowband regions and one or more UL narrowband regions for communicating with a BS, receiving from the BS an indication of a set of resources in at least one of the one or more DL narrowband regions or the one or more UL narrowband regions unavailable for the UE, identifying the set of resources based on the received indication, and communicating with the BS using the narrowband regions.

Certain aspects of the present disclosure provide an apparatus for wireless communications by a UE. The apparatus generally includes at least one processor configured to determine a plurality of narrowband regions partitioned from system bandwidth, the plurality of narrowband regions comprising one or more DL narrowband regions and one or more UL narrowband regions for communicating with a BS, receive from the BS an indication of a set of resources in at least one of the one or more DL narrowband regions or the one or more UL narrowband regions unavailable for the UE, identify the set of resources based on the received indication, and communicate with the BS using the narrowband regions, and memory coupled to the at least one processor.

Certain aspects of the present disclosure provide an apparatus for wireless communications by a UE. The apparatus generally includes means for determining a plurality of narrowband regions partitioned from system bandwidth, the plurality of narrowband regions comprising one or more DL narrowband regions and one or more UL narrowband regions for communicating with a BS, means for receiving from the BS an indication of a set of resources in at least one of the one or more DL narrowband regions or the one or more UL narrowband regions unavailable for the UE, means for identifying the set of resources based on the received indication, and means for communicating with the BS using the narrowband regions.

Certain aspects of the present disclosure provide a computer-readable medium for wireless communications by a UE. The computer-readable medium generally includes code to determine a plurality of narrowband regions partitioned from system bandwidth, the plurality of narrowband regions comprising one or more DL narrowband regions and one or more UL narrowband regions for communicating with a BS, code to receive from the BS an indication of a set of resources in at least one of the one or more DL narrowband regions or the one or more UL narrowband regions unavailable for the UE, code to identify the set of resources based on the received indication, and code to communicate with the BS using the narrowband regions.

Certain aspects of the present disclosure provide a method for wireless communications by a UE. The method generally includes determining a plurality of narrowband regions partitioned from system bandwidth, the plurality of narrowband regions comprising one or more DL narrowband regions and one or more UL narrowband regions for communicating with a BS, determining resources, within at least one of the one or more UL narrowband regions, for transmission of SRS, and communicating with the BS using the narrowband regions, wherein the communicating comprises transmitting SRS on the determined resources.

Certain aspects of the present disclosure provide an apparatus for wireless communications by a UE. The apparatus generally includes at least one processor configured to determine a plurality of narrowband regions partitioned from system bandwidth, the plurality of narrowband regions comprising one or more DL narrowband regions and one or more UL narrowband regions for communicating with a BS, determine resources, within at least one of the one or more UL narrowband regions, for transmission of SRS, and communicate with the BS using the narrowband regions, wherein the communicating comprises transmitting SRS on the determined resources, and memory coupled to the at least one processor.

Certain aspects of the present disclosure provide an apparatus for wireless communications by a UE. The apparatus generally includes means for determining a plurality of narrowband regions partitioned from system bandwidth, the plurality of narrowband regions comprising one or more DL narrowband regions and one or more UL narrowband regions for communicating with a BS, means for determining resources, within at least one of the one or more UL narrowband regions, for transmission of SRS, and means for communicating with the BS using the narrowband regions, wherein the communicating comprises transmitting SRS on the determined resources.

Certain aspects of the present disclosure provide a computer-readable medium for wireless communications by a UE. The computer-readable medium generally includes code to determine a plurality of narrowband regions partitioned from system bandwidth, the plurality of narrowband regions comprising one or more DL narrowband regions and one or more UL narrowband regions for communicating with a BS, code to determine resources, within at least one of the one or more UL narrowband regions, for transmission of SRS, and code to communicate with the BS using the narrowband regions, wherein the communicating comprises transmitting SRS on the determined resources.

Numerous other aspects are provided including methods, apparatus, systems, computer program products, computer-readable medium, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
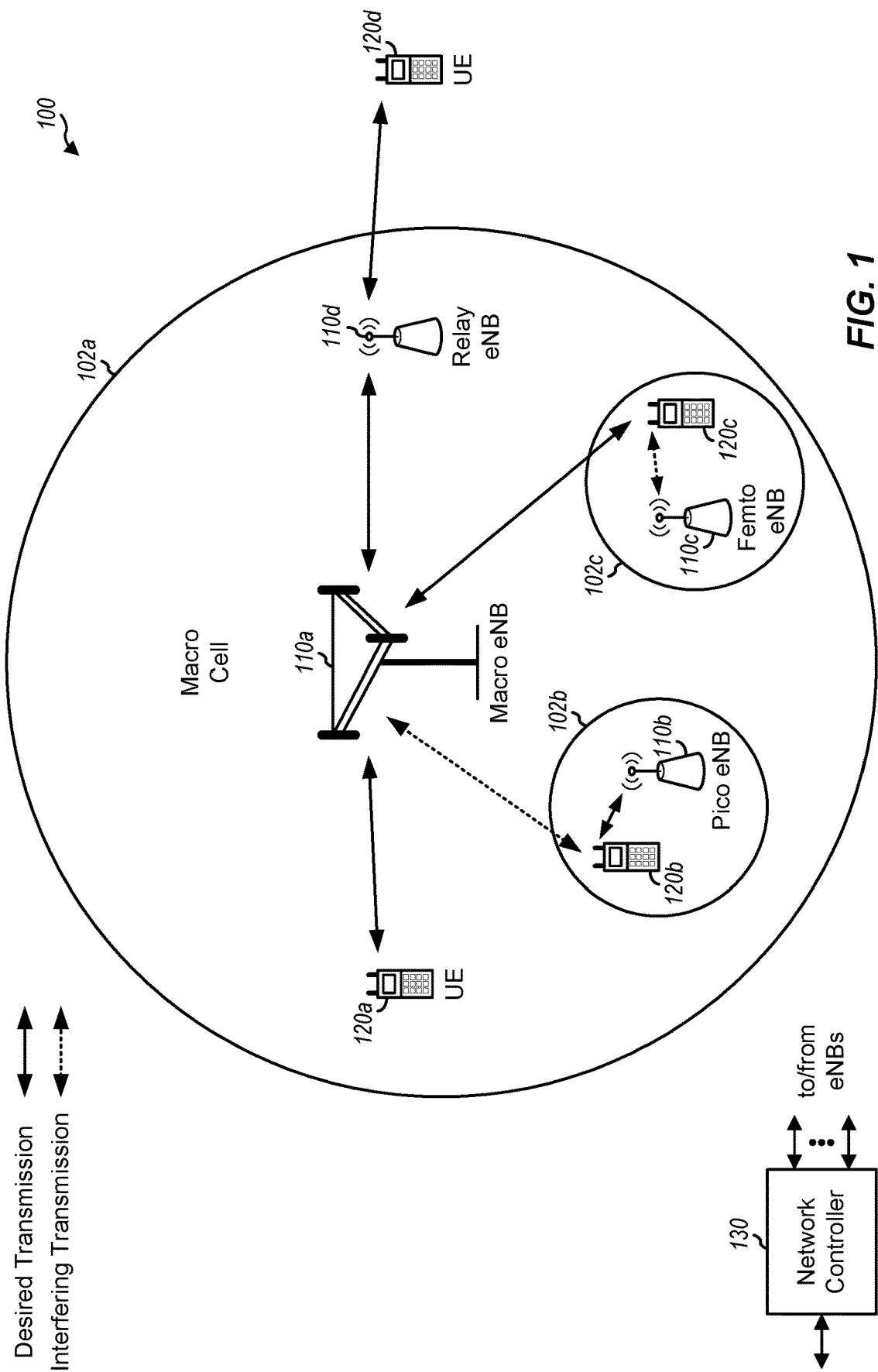
FIG. 1 is a block diagram conceptually illustrating an example wireless communication network, in accordance with certain aspects of the present disclosure.

Aspects of the present disclosure provide techniques and apparatus for narrowband management for devices with limited communication resources, such as low cost (LC) MTC devices, LC eMTC devices, or IoT devices. These devices may co-exist with other legacy devices in a particular radio access technology (RAT) (e.g., long term evolution (LTE)) and may operate on one or more narrowband regions partitioned out of an available system bandwidth that is supported by the particular RAT (e.g., LTE). Uplink (UL) system bandwidth and downlink (DL) system bandwidth may be partitioned into narrowband regions. Portions of the UL system bandwidth and/or of the DL system bandwidth may be reserved for other uses and may not be included in any of the narrowband regions. In addition, transmission resources of the UL and DL system bandwidth may be allocated for transmission of sounding reference signals (SRS).

Accordingly, as will be described in more detail below, the techniques presented herein may allow for cells and MTC devices to organize a DL system bandwidth into narrowband regions in a manner different than the manner used to organize an UL system bandwidth into narrowband regions. As will also be described in more detail below, techniques are provided to reserve transmission resources included in an UL narrowband region for use by legacy PUCCH transmissions. And, as will be described in more detail below, techniques are provided to allocate transmission resources to transmission of SRS such that all of the transmission resources for each SRS are within a narrowband region.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110*a* may be a macro eNB for a macro cell 102*a*, an eNB 110*b* may be a pico eNB for a pico cell 102*b*, and an eNB 110*c* may be a femto eNB for a femto cell 102*c*. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110*d* may communicate with macro eNB 110*a* and a UE 120*d* in order to facilitate communication between eNB 110*a* and UE 120*d*. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120*a*, 120*b*, 120*c*) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, navigation devices, entertainment devices (e.g., gaming devices, music players), cameras, a netbook, a smartbook, an ultrabook, wearable devices (e.g., smart glasses/goggles, smart watch, smart wristbands, smart bracelets, smart clothing, heads-up displays), drones, robots/robotic devices, medical devices, vehicular devices, etc. MTC UEs may include sensors, meters, monitors, location tags, drones, trackers, robots/robotic devices, etc. MTC UEs, as well as other UEs, may be implemented as internet of things (IoT) devices (e.g., narrowband IoT (NB-IoT)) or internet of everything (IoE) devices. To enhance coverage of certain devices, such as MTC devices or IoT devices, "bundling" may be utilized in which certain transmissions are sent as a bundle of transmissions, for example, with the same information transmitted over multiple subframes One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, IoT (e.g., NB-IoT) devices, etc. are referred to generally as LC UEs. Similarly, legacy devices, such as legacy and/or advanced UEs (e.g., in LTE), are referred to generally as non-LC UEs.

Figure 2:
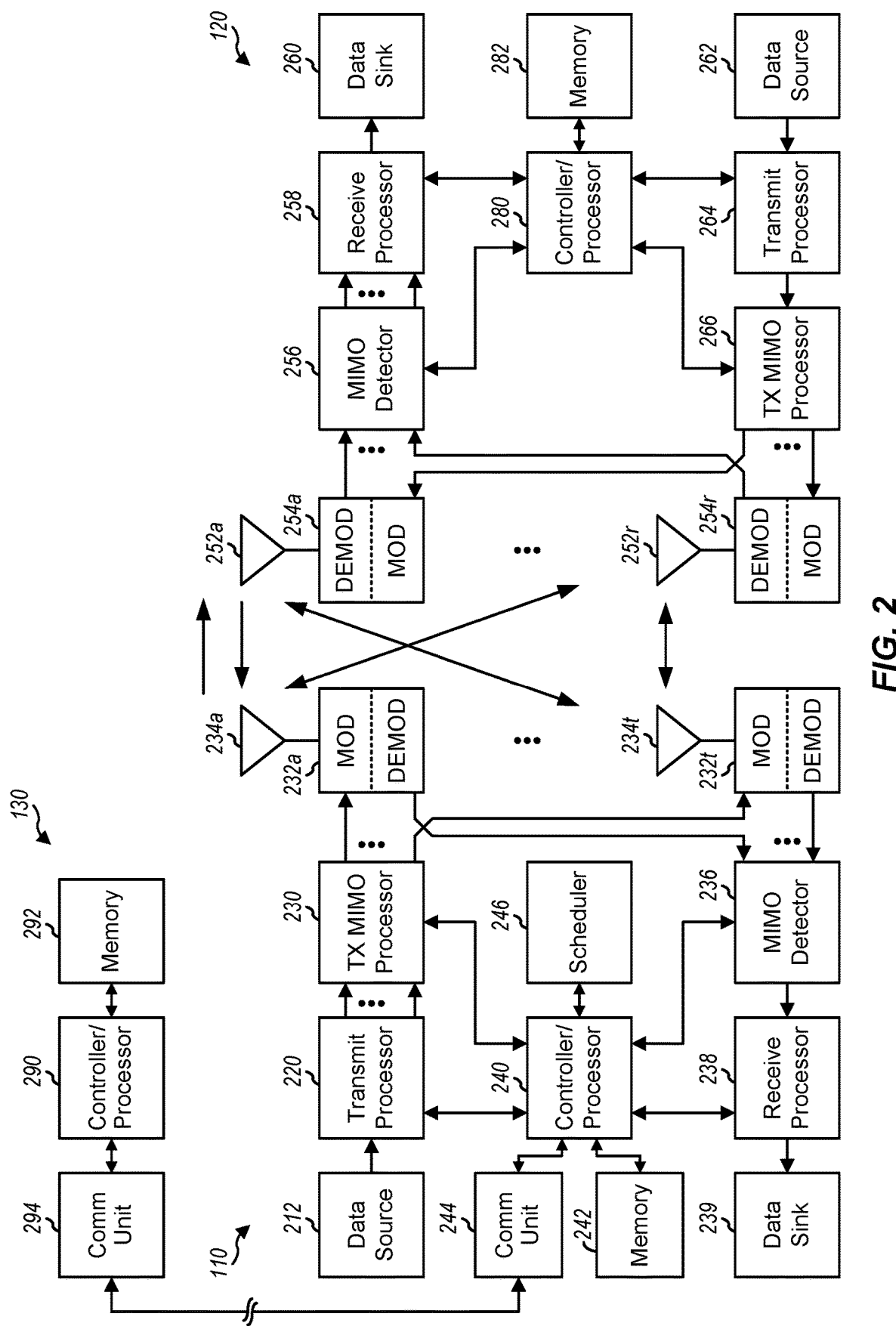
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234*a* through 234*t*, and UE 120 may be equipped with R antennas 252*a* through 252*r*, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from BS 110 and/or other BSs and may provide received signals to demodulators (DEMODs) 254*a* through 254*r*, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254*a* through 254*r* (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 9, 13, 16 and/or other processes for the techniques described herein. Similarly, controller/processor 280 and/or other processors and modules at UE 120 may perform or direct operations illustrated in FIGS. 10, 14, 17 and/or processes for the techniques described herein. Memories 242 and 282 may store data and program codes for BS 110 and UE 120, respectively. A scheduler 246 may schedule UEs for data transmission on the downlink and/or uplink.

Figure 3:
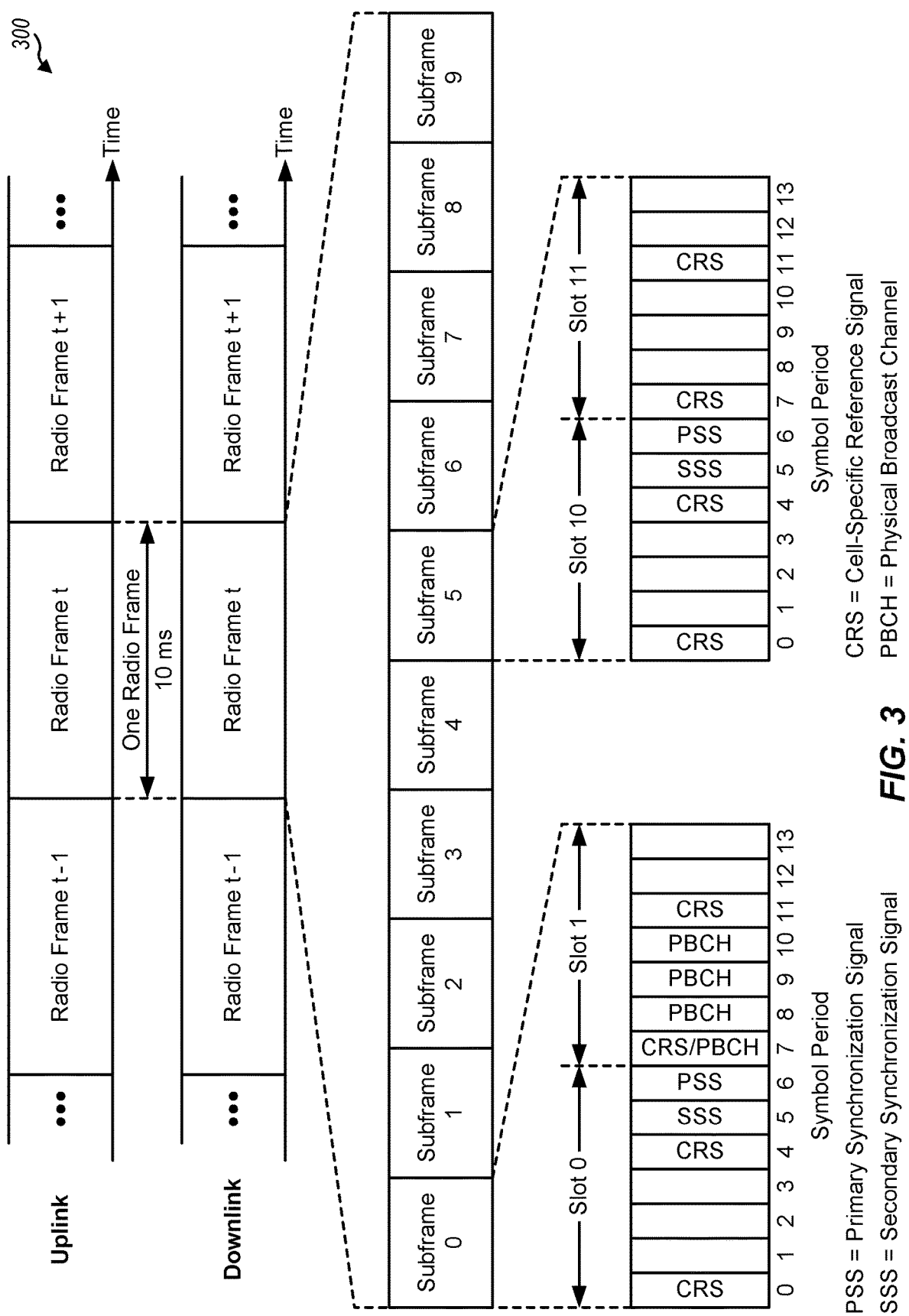
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
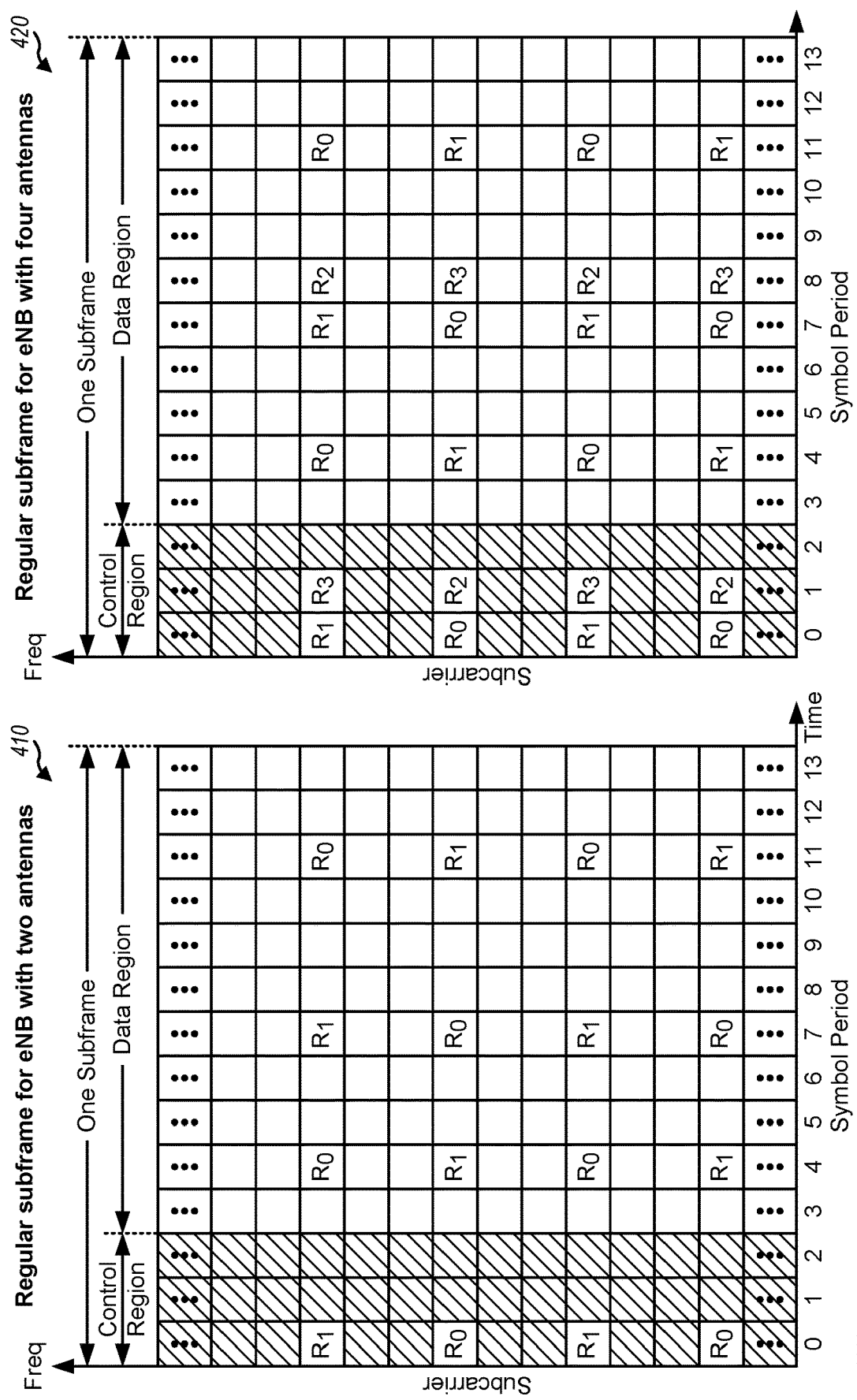
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Figure 5A:
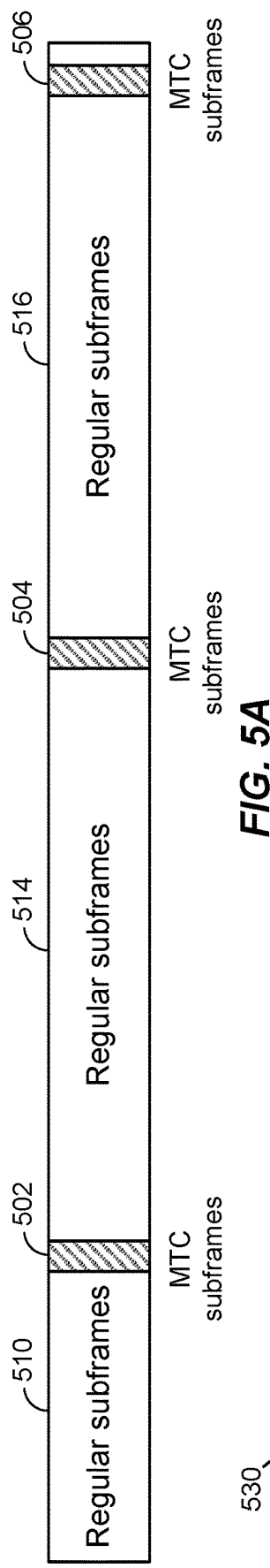
FIGS. 5A and 5B illustrate an example of machine type communications (MTC) co-existence with other wireless communications within a wideband system, such as LTE, in accordance with certain aspects of the present disclosure.
Figure 5B:
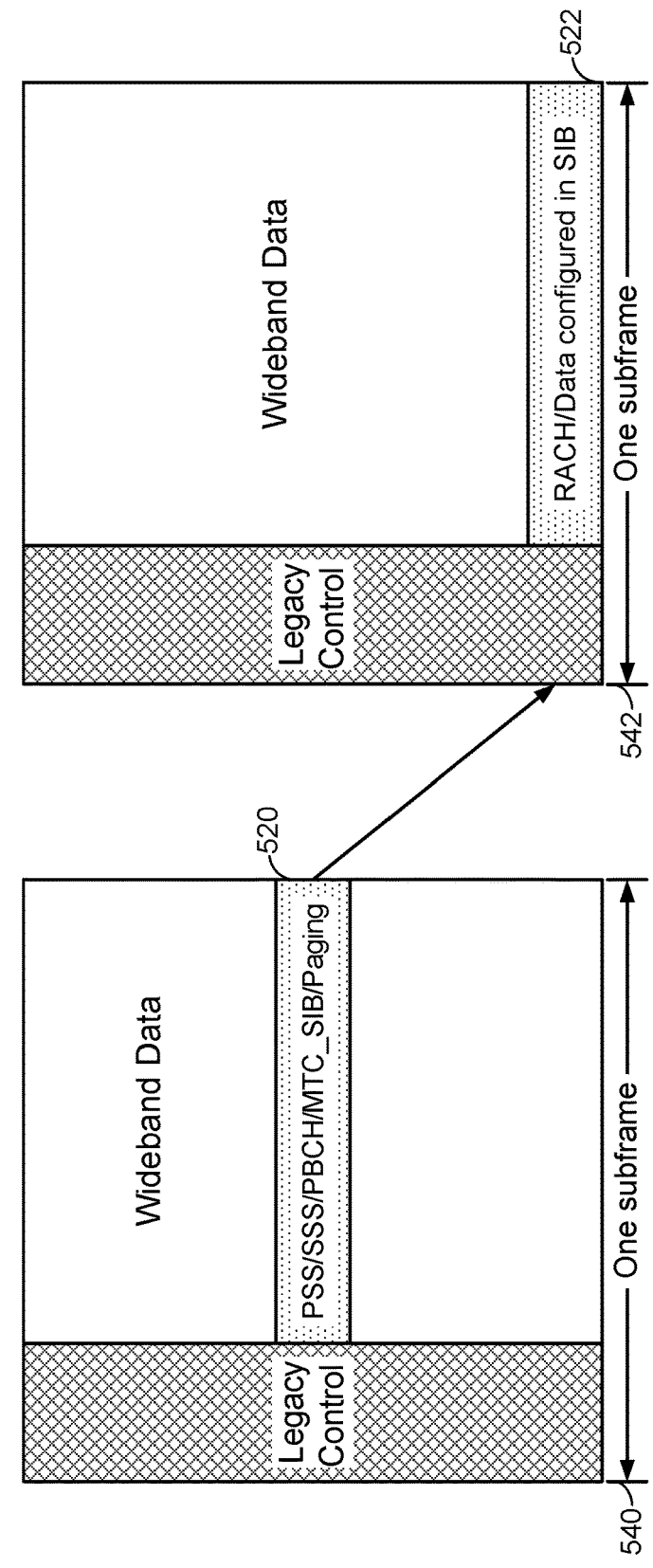

Example MTC Coexistence with Other Wireless Communications within a Wideband System As mentioned above, MTC and/or eMTC operation may be supported in a wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 502, 504, 506 associated with MTC and/or eMTC operation may be time division multiplexed (TDM) with regular subframes 510, 512, 514 associated with LTE or some other RAT. Within a cell, some MTC subframes may be regularly scheduled, with the schedule of MTC subframes made known to MTC UEs within the cell, for example, by broadcasts from a BS supporting the cell. Other MTC subframes may be dynamically scheduled on an as needed basis by the BS, with the BS transmitting indications of the dynamically scheduled MTC subframes, for example, in broadcasts or in unicast communications during regularly scheduled MTC subframes.

Additionally or alternatively, as illustrated in the example frame structure of FIG. 5B, one or more narrowband regions 520, 522 used by LC UEs in MTC may be frequency division multiplexed within the wider bandwidth 530 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 520 (e.g., spanning no more than 6 RBs of the system bandwidth) of a subframe 540 may be monitored by one or more LC UEs for either a PSS, SSS, PBCH, MTC system information block (SIB), or paging transmission from a BS in the wireless communication network. As also shown in FIG. 5B, a second narrowband region 522 (e.g., also spanning no more than 6 RBs of the system bandwidth) of a subframe 542 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein are in reference to a narrowband of 6 RBs, those skilled in the art will recognize that the techniques presented herein may also be applied to different sizes of narrowband regions, for example, 1 RB.

Example Narrowband Management for MTC

As mentioned above, in certain systems, e.g., such as LTE Rel-13, narrowband operation for MTC (e.g., eMTC) may be supported. A cell supporting narrowband operation for MTC may have different system bandwidths for downlink (DL) and uplink (UL) operations. A cell having different DL and UL system bandwidths may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of an UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned, the bandwidth of narrowband regions may be six RBs. The fact that six RBs are not integrally divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign an UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of an UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region.

Figure 6:
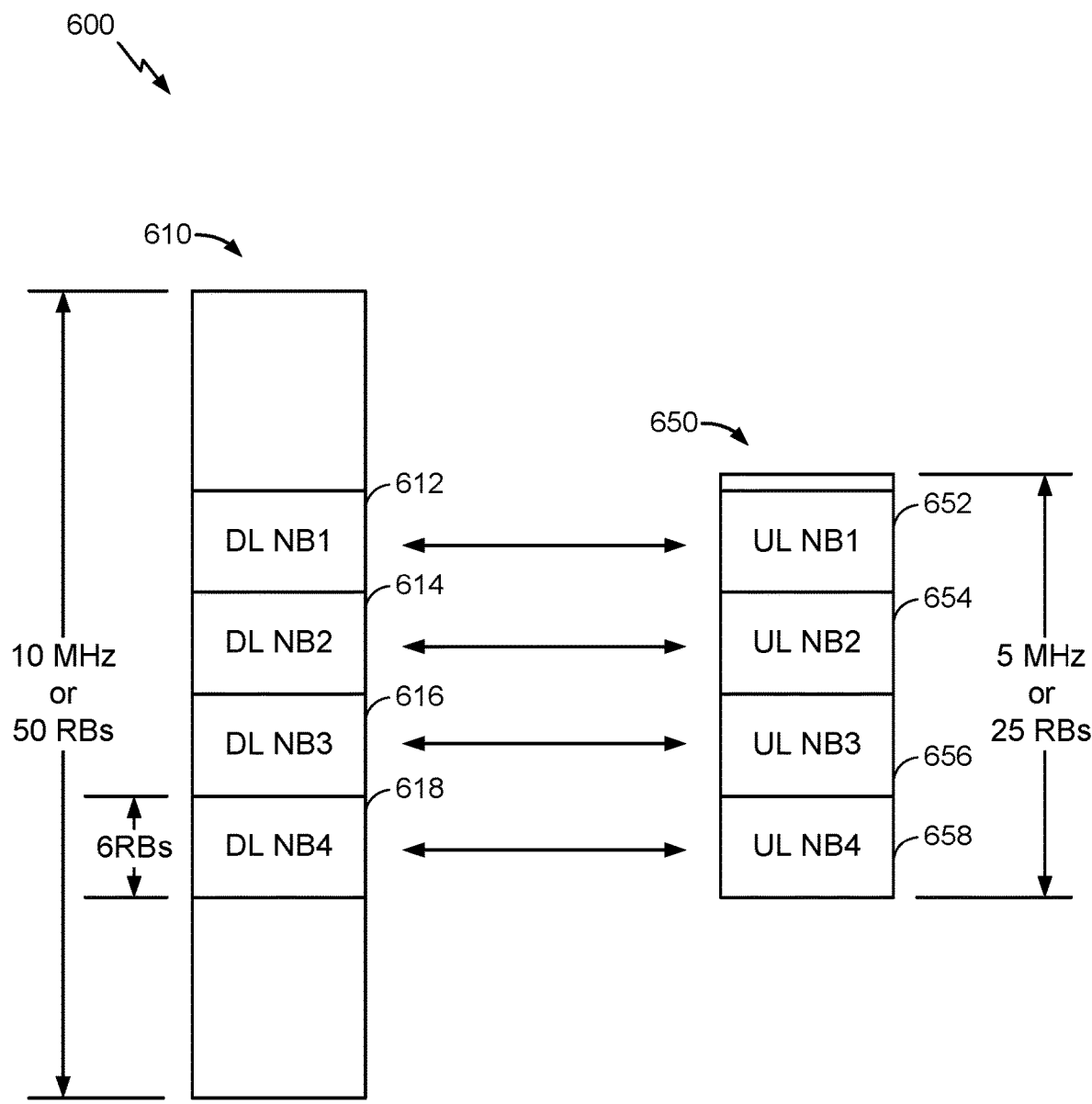
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping might be employed by eNB 110a in FIG. 1, for example. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 might determine that the UL system bandwidth 650 is smaller than DL system bandwidth 610 (i.e., the 5 MHz size of UL system bandwidth 650 is the minimum size of the UL system bandwidth 650 and the DL system bandwidth 610). The BS might then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

According to aspects of the present disclosure, another technique for mapping UL and DL narrowband regions by a BS is provided. A BS may determine a number of DL narrowband regions that can be organized from the DL system bandwidth of the BS and a number of UL narrowband regions that can be organized from the UL system bandwidth of the BS, organize the determined numbers of DL narrowband regions and UL narrowband regions, and then determine a mapping of the DL narrowband regions to the UL narrowband regions. The BS may map more than one DL narrowband region to each UL narrowband region or more than one UL narrowband region to each DL narrowband region. If a BS maps more than one DL narrowband region to one UL narrowband region, the BS may schedule transmissions to MTC UEs using the DL narrowband regions in such a manner that any reply from a first UE (e.g., an ACK/NAK) will not interfere with replies from other UEs. Likewise, if a BS maps more than one UL narrowband region to one DL narrowband region, the BS may schedule transmissions from MTCs using the UL narrowband regions such that no two MTC UEs will expect replies from the BS that will collide (e.g., ACK/NAKs in the same resources elements of the same resource block of the DL narrowband region).

Figure 7:
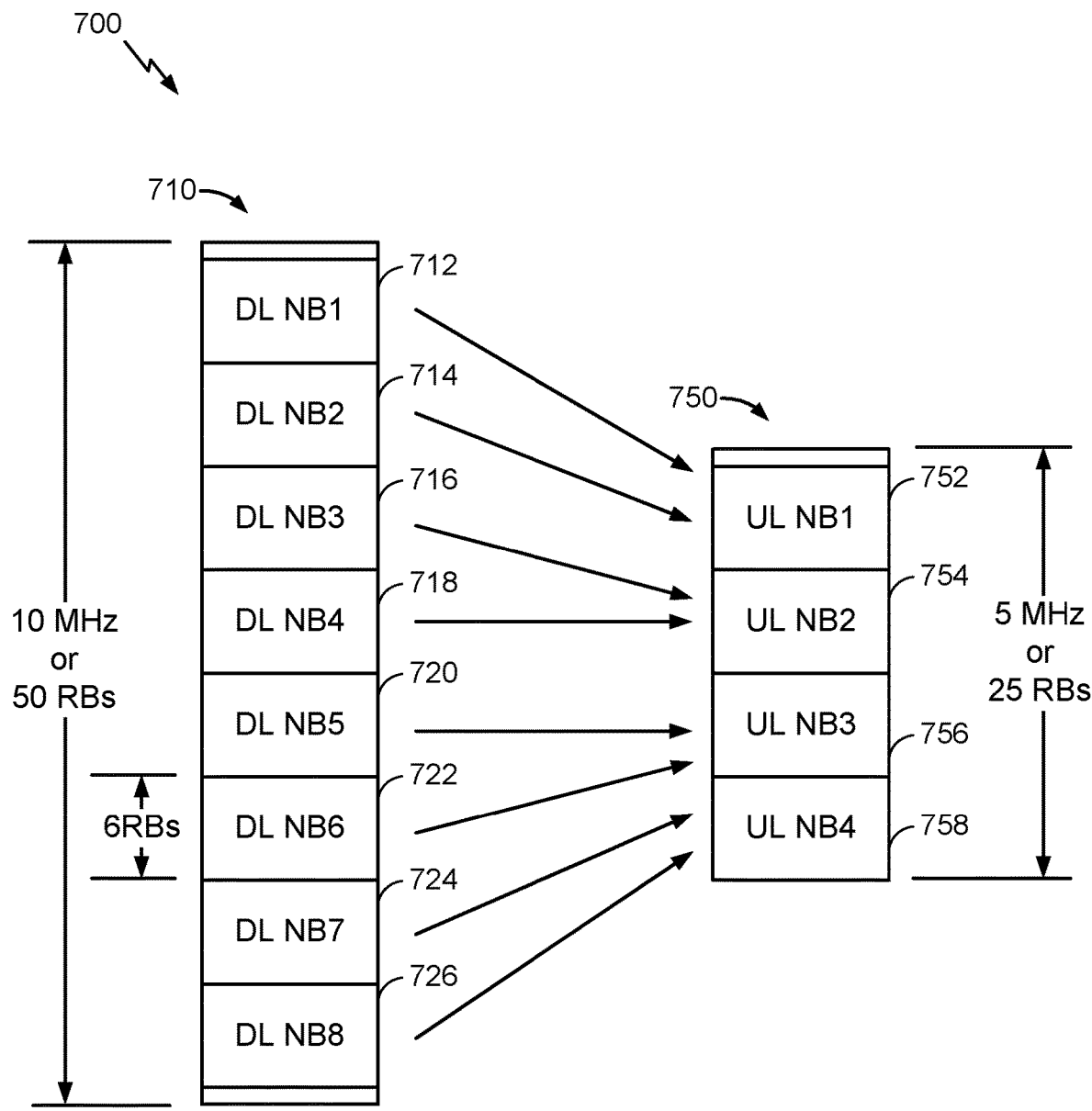
FIG. 7 illustrates an exemplary mapping of DL narrowband regions to UL narrowband regions, in accordance with certain aspects of the present disclosure.

FIG. 7 illustrates an exemplary mapping 700 of DL narrowband regions to UL narrowband regions, as described above. Such a mapping might be employed by eNB 110a in FIG. 1, for example. While FIG. 7 shows the DL system bandwidth 710 and the UL system bandwidth 750 as apparently in the same frequency ranges, the DL system bandwidth and the UL system bandwidth are in different frequency ranges in a cell using FDD. The DL system bandwidth is ten MHz or fifty RBs wide, and the UL system bandwidth is five MHz or twenty-five RBs wide. A BS supporting MTC UEs while operating the DL system bandwidth and the UL system bandwidth might determine that the BS can organize four narrowband regions 752, 754, 756, and 758 from the UL system bandwidth. The BS may then determine that the BS can organize eight narrowband regions 712, 714, 716, 718, 720, 722, 724, and 726 from the DL system bandwidth. The BS may then organize the eight narrowband regions from the DL system bandwidth and the four UL narrowband regions from the UL system bandwidth. The BS may then map DL narrowband regions 712 and 714 to UL narrowband region 752, DL narrowband regions 716 and 718 to UL narrowband region 754, DL narrowband regions 720 and 722 to UL narrowband region 756, and DL narrowband regions 724 and 726 to UL narrowband region 758. The BS may schedule transmissions to the MTC UEs using DL narrowband region 712 or DL narrowband region 714 in such a manner that any reply from an MTC UE using UL narrowband region 752 does not interfere with a reply from another MTC UE using UL narrowband region 752.

According to aspects of the present disclosure, a mapping of DL narrowband regions to UL narrowband regions may be UE-specific. That is, a mapping of DL narrowband regions to UL narrowband regions may apply to a particular UE (e.g., an MTC UE) being served by a cell, and other UEs being served by that cell may use a different mapping of DL narrowband regions to UL narrowband regions. A BS (e.g., eNodeB 110a in FIG. 1) may signal indications of the various mappings to be used to UEs being served in the cell. For example and with reference to FIG. 7, a BS may map DL narrowband regions 712 and 714 to UL narrowband region 752 for a first MTC UE while mapping narrowband regions 716 and 718 to UL narrowband region 752 for a second MTC UE.

According to aspects of the present disclosure, a mapping of DL narrowband regions to UL narrowband regions may be common to a plurality of UEs. For example, a mapping of DL narrowband regions to UL narrowband regions may apply to all MTC UEs being served by a cell, while other cells in a network may use different mappings. In a second example, a BS may use a first mapping for a first group of MTC UEs, while the BS uses a second mapping for a second group of MTC UEs. In the second example, the BS may schedule (e.g., persistently schedule) the MTC UEs on different sets of regularly occurring MTC subframes. A BS (e.g., eNodeB 110a in FIG. 1) may signal an indication of the mapping(s) in a broadcast transmission or in one or more dedicated messages to each of the plurality of UEs.

Figure 8:
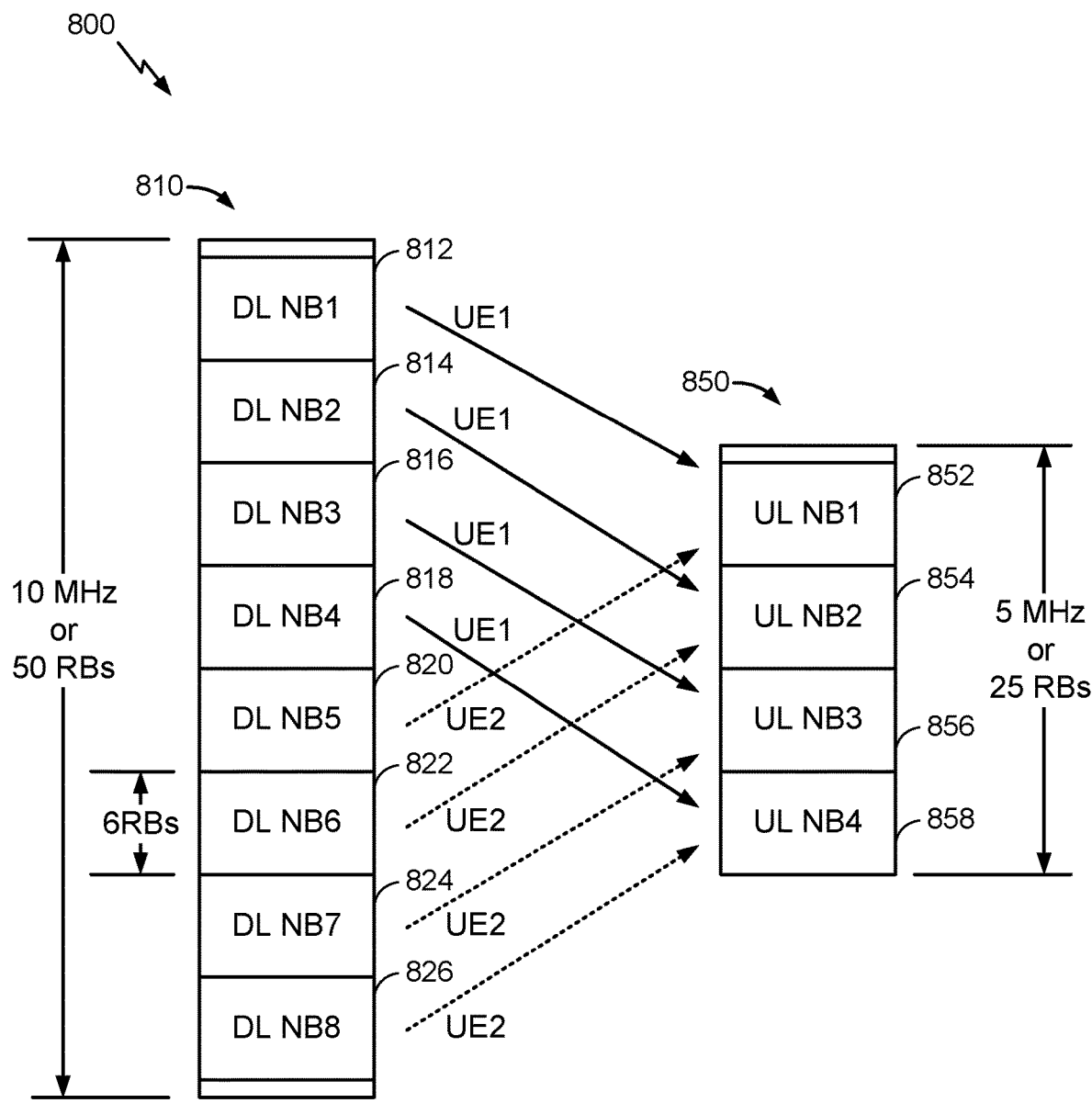
FIG. 8 illustrates an exemplary mapping of DL narrowband regions to UL narrowband regions, in accordance with certain aspects of the present disclosure.

FIG. 8 illustrates an exemplary mapping 800 of DL narrowband regions to UL narrowband regions, as described above. Such a mapping might be employed by eNB 110a with UEs 120a and 120c in FIG. 1, for example. While FIG. 8 shows the DL system bandwidth 810 and the UL system bandwidth 850 as apparently in the same frequency ranges, the DL system bandwidth and the UL system bandwidth are in different frequency ranges in a cell using FDD. The DL system bandwidth is ten MHz or fifty RBs wide, and the UL system bandwidth is five MHz or twenty-five RBs wide. A BS supporting MTC UEs (e.g., UEs 120a and 120c) while operating the DL system bandwidth and the UL system bandwidth might determine that the BS can organize four narrowband regions 852, 854, 856, and 858 from the UL system bandwidth. The BS may then determine that the BS can organize eight narrowband regions 812, 814, 816, 818, 820, 822, 824, and 826 from the DL system bandwidth. The BS may then organize the eight narrowband regions from the DL system bandwidth and the four UL narrowband regions from the UL system bandwidth. The BS may then map, for a first UE (e.g., UE1 or UE 120a from FIG. 1), DL narrowband region 812 to UL narrowband region 852, DL narrowband region 814 to UL narrowband region 854, DL narrowband region 816 to UL narrowband region 856, and DL narrowband region 818 to UL narrowband region 858. The BS may also map, for a second UE (e.g., UE2 or UE 120c from FIG. 1) DL narrowband region 820 to UL narrowband region 852, DL narrowband region 822 to UL narrowband region 854, DL narrowband region 824 to UL narrowband region 856, and DL narrowband region 826 to UL narrowband region 858.

Figure 9:
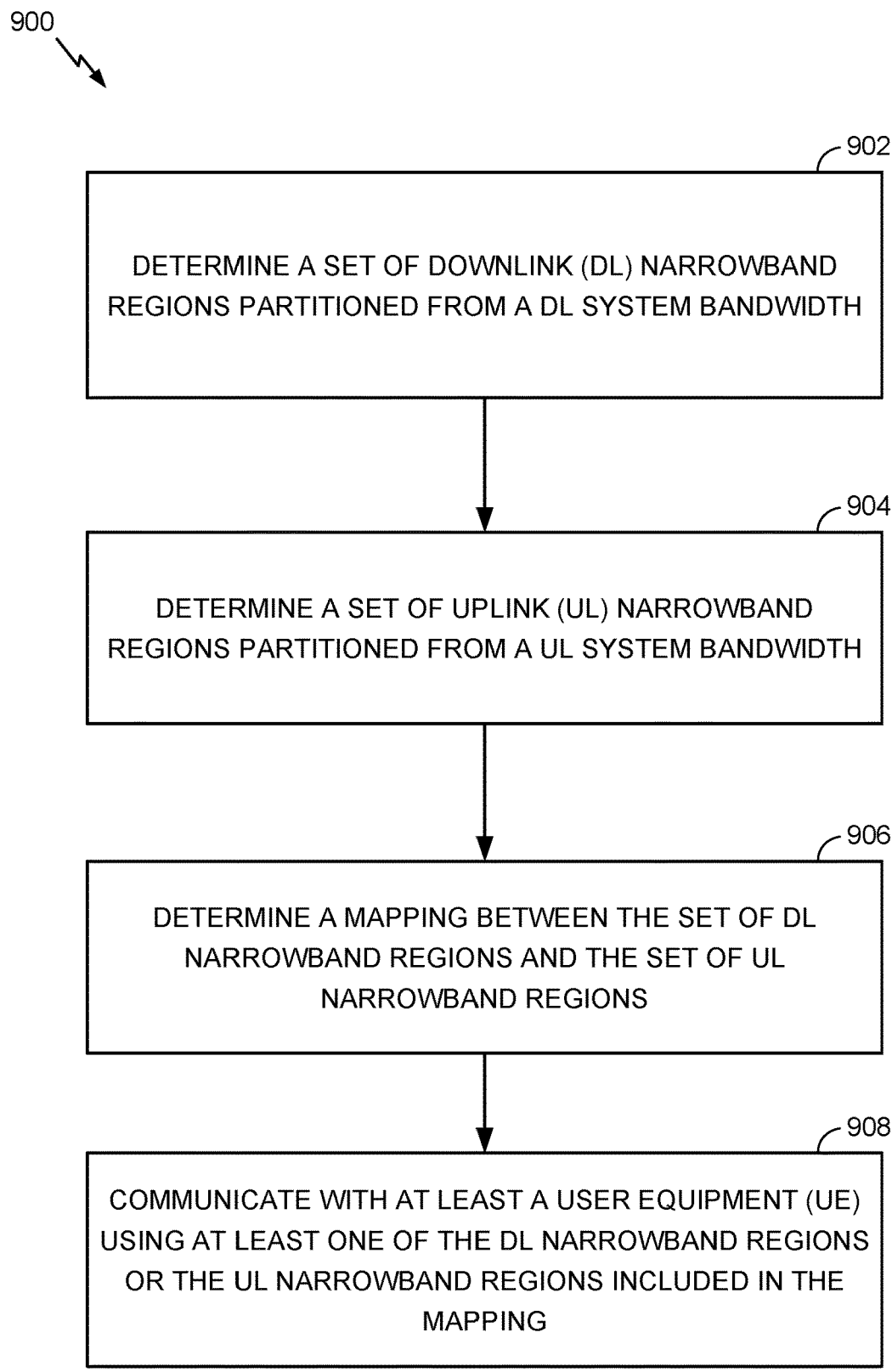
FIG. 9 illustrates an exemplary operation for wireless communications that may be performed by a BS, in accordance with certain aspects of the present disclosure.

FIG. 9 illustrates an example operation 900 for wireless communications that may be performed by a BS (e.g., eNodeB 110a in FIG. 1), according to aspects of the present disclosure. The operation 900 may be performed by a BS to support MTC UEs, and may use one of the exemplary mappings illustrated in FIGS. 6-8 or another mapping.

Operation 900 begins at block 902, wherein the BS determines a set of downlink (DL) narrowband regions partitioned from a DL system bandwidth. For example and with reference to FIG. 6, a BS may determine a set of four DL narrowband regions 612, 614, 616, 618 from a DL system bandwidth 610 of 10 MHz or 50 RBs. The BS may determine the DL narrowband regions by, for example, referring to a network standard or performing an algorithm.

Operation 900 continues at block 904, wherein the BS determines a set of uplink (UL) narrowband regions partitioned from an UL system bandwidth. Continuing the example with reference to FIG. 6, the BS may determine a set of four UL narrowband regions 652, 654, 656, 658 are partitioned from an UL system bandwidth 650 of 5 MHz or 25 RBs.

At block 906, the BS determines a mapping between the set of DL narrowband regions and the set of UL narrowband regions. Continuing the example with reference to FIG. 6, the BS may determine that the first DL narrowband region 612 maps to the first UL narrowband region 652, the second DL narrowband region 614 maps to the second UL narrowband region 654, the third DL narrowband region 616 maps to the third UL narrowband region 656, and the fourth DL narrowband region 618 maps to the fourth UL narrowband region 658.

Operation 900 continues at block 908, wherein the BS communicates with at least a user equipment (UE) using at least one of the DL narrowband regions or the UL narrowband regions included in the mapping. Continuing the example with reference to FIG. 6, the BS may transmit to a UE (e.g., UE 120a shown in FIG. 1) using the first DL narrowband region 612.

Figure 10:
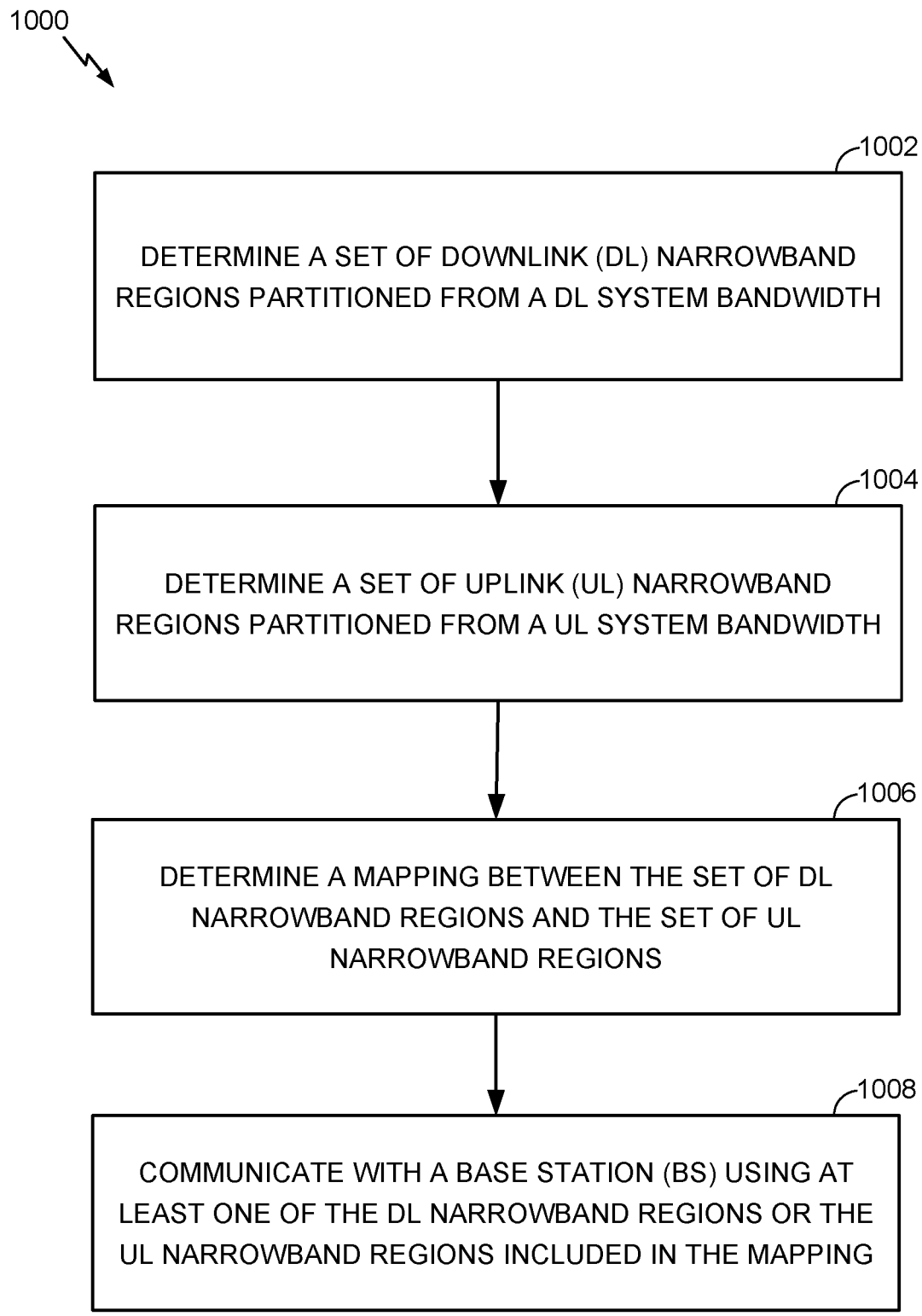
FIG. 10 illustrates an exemplary operation for wireless communications that may be performed by a UE, in accordance with certain aspects of the present disclosure.

FIG. 10 illustrates an example operation 1000 for wireless communications that may be performed by a UE (e.g., UE 120a in FIG. 1), according to aspects of the present disclosure. The operation 1000 may be performed by an MTC UE, for example, and may use one of the exemplary mappings illustrated in FIGS. 6-8, or another mapping.

Operation 1000 begins at block 1002, wherein the UE determines a set of downlink (DL) narrowband regions partitioned from a DL system bandwidth. Continuing the example with reference to FIG. 6, a UE may determine set of four DL narrowband regions 612, 614, 616, 618 are partitioned from a DL system bandwidth 610 of 10 MHz or 50 RBs. The UE may determine the DL narrowband regions by, for example, referring to a network standard or decoding a broadcast message from a BS.

Operation 1000 continues at block 1004, wherein the UE determines a set of uplink (UL) narrowband regions partitioned from an UL system bandwidth. Continuing the example with reference to FIG. 6, the UE may determine a set of four UL narrowband regions 652, 654, 656, 658 are partitioned from an UL system bandwidth 650 of 5 MHz or 25 RBs. The UE may determine the DL narrowband regions by, for example, referring to a network standard or decoding a broadcast message from a BS.

At block 1006, the UE determines a mapping between the set of DL narrowband regions and the set of UL narrowband regions. As discussed, the mapping may be explicitly signaled or implicit. Continuing the example with reference to FIG. 6, the UE may determine the first DL narrowband region 612 maps to the first UL narrowband region 652, the second DL narrowband region 614 maps to the second UL narrowband region 654, the third DL narrowband region 616 maps to the third UL narrowband region 656, and the fourth DL narrowband region 618 maps to the fourth UL narrowband region 658.

Operation 1000 continues at block 1008, wherein the UE communicates with a base station (BS) using at least one of the DL narrowband regions or the UL narrowband regions included in the mapping. Continuing the example with reference to FIG. 6, the UE may receive a transmission from a BS in the first DL narrowband region 612.

According to aspects of the present disclosure, a cell dividing an UL system bandwidth and a DL system bandwidth into narrowband regions may use frequency hopping with the narrowband regions. A cell may determine frequency hopping patterns for the assignments of the DL narrowband regions and the UL narrowband regions, for example, based on network specification. A UE operating in a cell using frequency hopping with narrowband regions may determine frequency hopping patterns of assignments of DL narrowband regions and assignments of UL narrowband regions, for example, based on a received signal indicating one or more frequency hopping patterns.

A cell may use a different frequency hopping pattern for the DL narrowband regions than the cell uses for the UL narrowband regions. That is, a cell may divide a DL system bandwidth into a plurality of narrowband regions, and have assignments of narrowband regions to UEs hop across the DL system bandwidth, such that a UE may retune to several narrowband regions while operating in the cell. Similarly, a cell may divide an UL system bandwidth into a plurality of narrowband regions, and have assignments of narrowband regions to UEs hop across the UL system bandwidth, such that a UE may retune to several narrowband regions while operating in the cell. The frequency hopping of DL narrowband regions and UL narrowband regions may each follow a pattern, but the patterns may be different.

Figure 11:
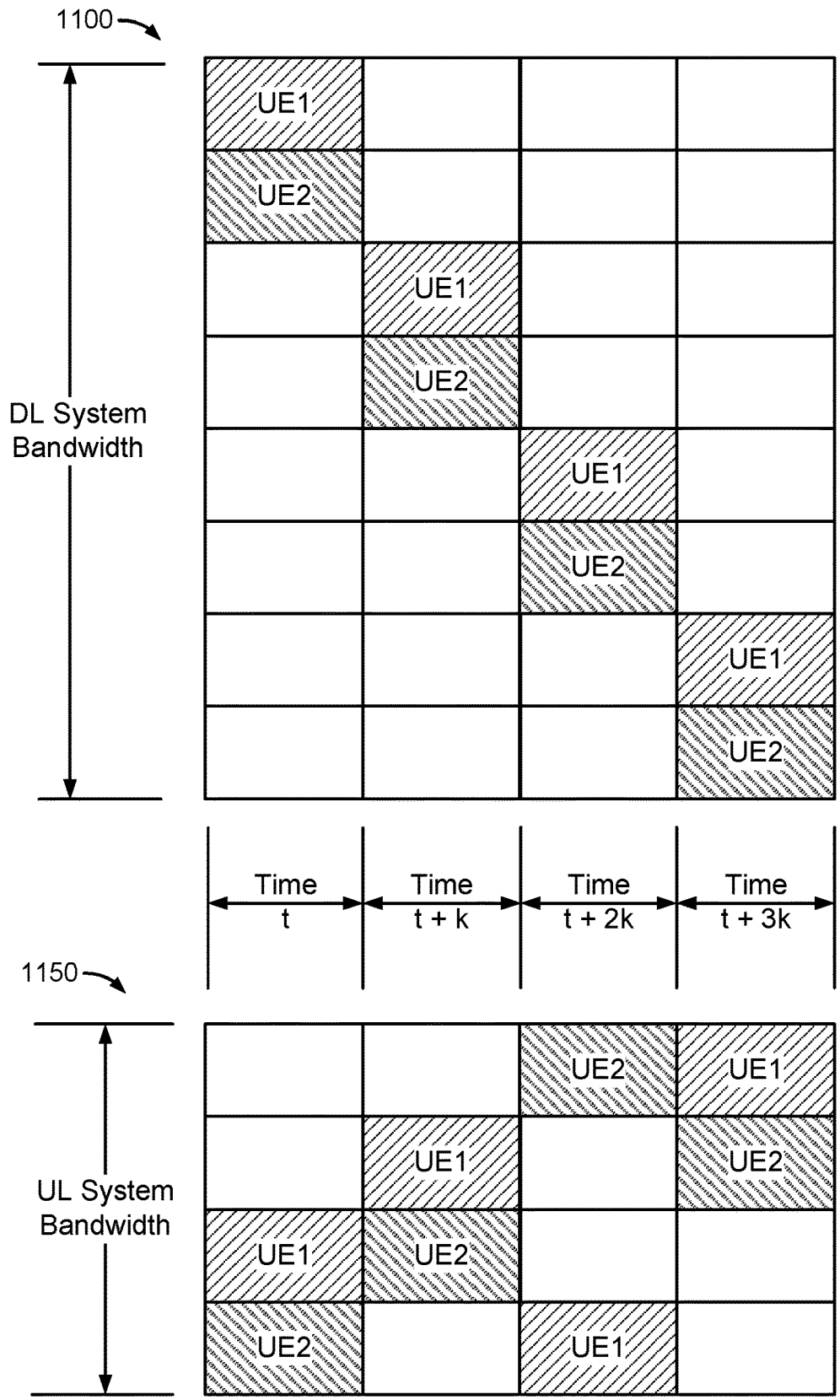
FIG. 11 illustrates exemplary frequency hopping patterns for DL narrowband regions and UL narrowband regions, in accordance with certain aspects of the present disclosure.

FIG. 11 illustrates exemplary frequency hopping patterns 1100 and 1150 for DL narrowband regions and UL narrowband regions, according to aspects of the present disclosure. Such frequency hopping patterns might be employed by eNB 110a with UEs 120a (e.g., UE1) and 120c (e.g., UE2) in FIG. 1, for example. In exemplary frequency hopping pattern 1100, a BS has organized eight narrowband regions from a DL system bandwidth. At time t, UE1 and UE2 are assigned the two highest DL narrowband regions, as illustrated. Later, at time t+k, UE1 and UE2 are assigned the next two lower DL narrowband regions. UE1 and UE2 are each assigned a lower DL narrowband region at times t+2 k and t+3 k, as illustrated. Meanwhile, a different exemplary frequency hopping pattern 1150 may be employed for the UL narrowband regions. At time t, UE1 and UE2 are assigned the two lowest UL narrowband regions. At time t+k, UE1 and UE2 are assigned the two middle UL narrowband regions. At time t+2 k, UE1 and UE2 are assigned the lowest and highest UL narrowband regions, and at time t+3 k, UE1 and UE2 are assigned the two highest UL narrowband regions. Other frequency hopping patterns for DL narrowband regions and UL narrowband regions are possible, and are included in the scope of the disclosure.

According to aspects of the present disclosure, transmission resources (e.g., resource elements or resource blocks) may be reserved for other uses when a system bandwidth is organized into narrowband regions. For example, transmission resources at the edge of an UL system bandwidth may be reserved for legacy (e.g., Rel-9) UEs to transmit physical uplink control channel (PUCCH) signals, and MTC UEs may not be permitted to use the reserved resources. The resources may be reserved by excluding the reserved resources when organizing the system bandwidth into narrowband regions. Additionally or alternatively, the system bandwidth may be organized into narrowband regions including the reserved resources, and then UEs utilizing narrowband regions including the reserved resources may be informed that the reserved resources are not to be used.

Figure 12:
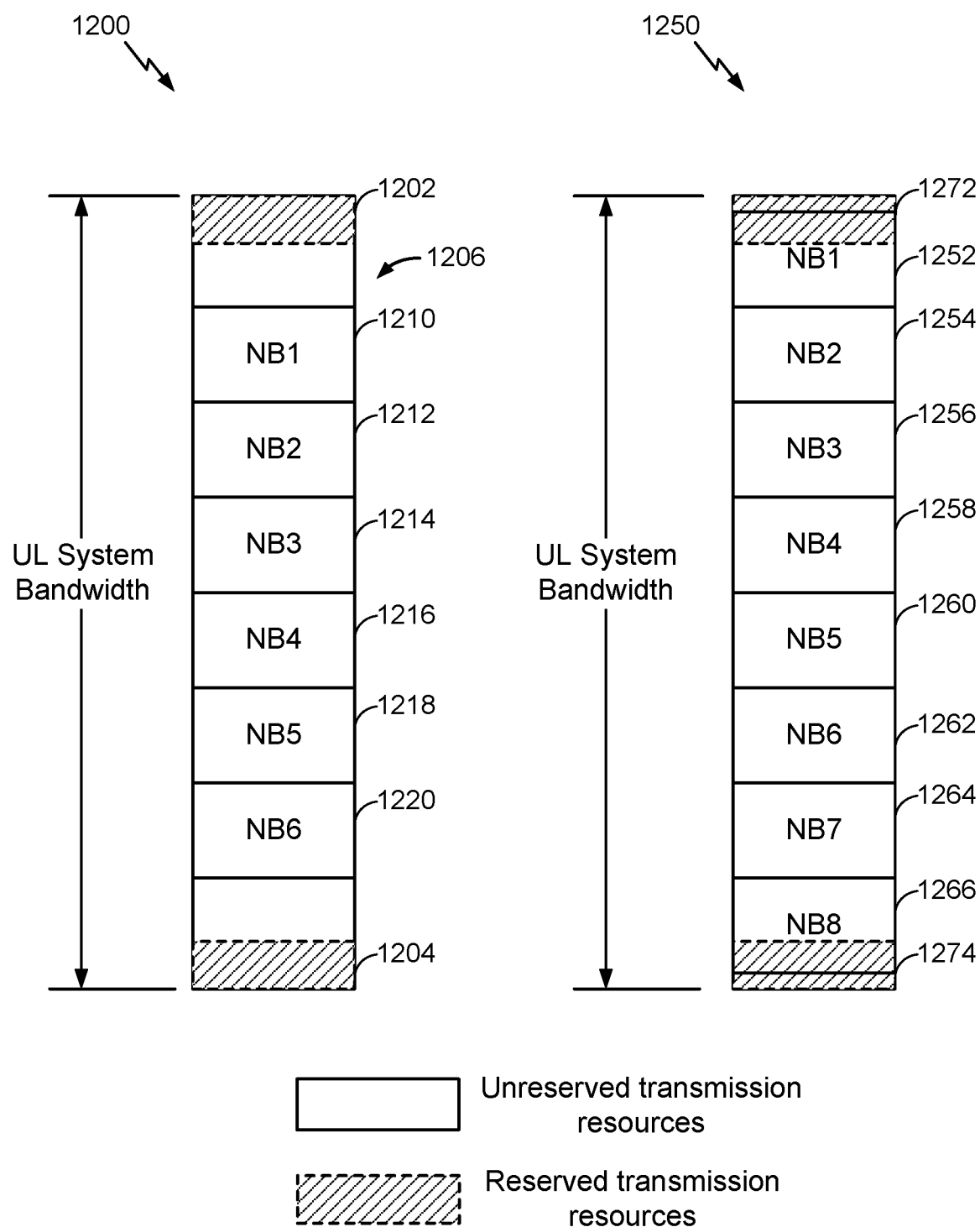
FIG. 12 illustrates exemplary techniques of reserving transmission resources, in accordance with certain aspects of the present disclosure.

FIG. 12 illustrates two exemplary techniques 1200 and 1250 of reserving transmission resources when organizing a system bandwidth into narrowband regions, according to aspects of the present disclosure. In technique 1200, reserved portions 1202, 1204 (e.g., reserved for PUCCH transmissions) of the UL system bandwidth are excluded from organization into narrowband regions, and the unreserved portion 1206 of the UL system bandwidth is organized into narrowband regions 1210, 1212, 1214, 1216, 1218, 1220. As illustrated, this may result in parts of the unreserved system bandwidth being left out of any narrowband regions. In technique 1250, the UL system bandwidth is divided into narrowband regions 1252, 1254, 1256, 1258, 1260, 1262, 1264, 1266 without excluding the reserved portions 1272, 1274. In a cell using the technique 1250, the cell may inform any UEs (e.g., MTC UEs) assigned to use narrowband region 1252 and/or narrowband region 1266 that the reserved transmission resources (e.g., in granularity of resource elements, resource blocks, symbols, etc.) are not to be used by the UEs.

Figure 13:
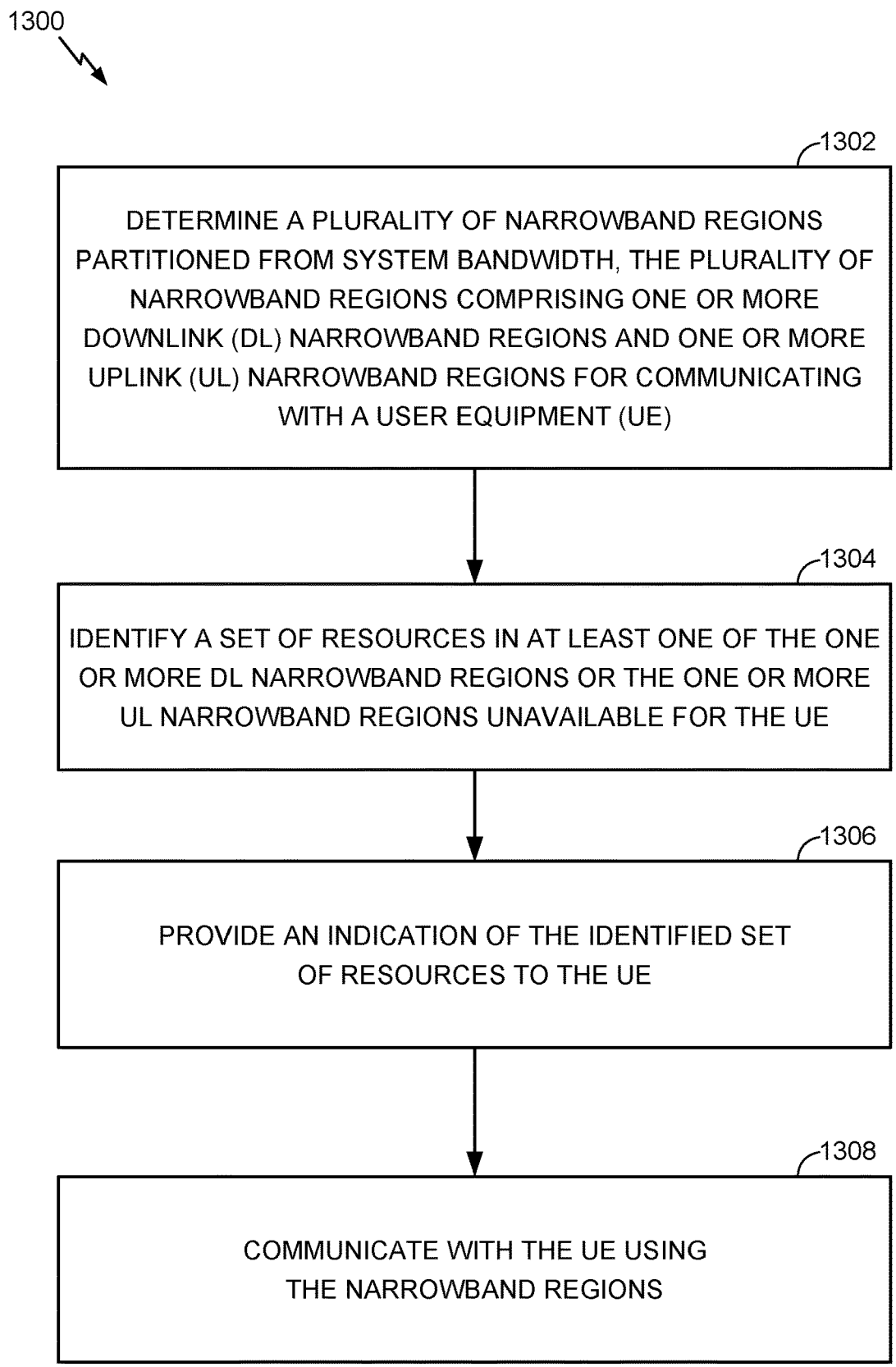
FIG. 13 illustrates an exemplary operation for wireless communications that may be performed by a BS, in accordance with certain aspects of the present disclosure.

FIG. 13 illustrates example operation 1300 for wireless communications that may be performed by a BS (e.g., eNodeB 110a in FIG. 1), according to aspects of the present disclosure. The operation 1300 may be performed by a BS to support MTC UEs, and may use one of the exemplary techniques of reserving transmission resources illustrated in FIG. 12.

Operation 1300 begins at block 1302, wherein the BS determines a plurality of narrowband regions partitioned from system bandwidth, the plurality of narrowband regions comprising one or more downlink (DL) narrowband regions and one or more uplink (UL) narrowband regions for communicating with a user equipment (UE). The BS may determine the DL and UL narrowband regions by, for example, performing a scheduling algorithm. For example and with reference to FIG. 12, a BS may determine a DL narrowband region (not shown) from a DL system bandwidth and an UL narrowband region 1252 from an UL system bandwidth of 10 MHz or 50 RBs for communicating with a UE (e.g., UE 120a in FIG. 1).

Operation 1300 continues at block 1304, wherein the BS identifies a set of resources in at least one of the one or more DL narrowband regions or the one or more UL narrowband regions unavailable for the UE. Continuing the example above with reference to FIG. 12, the BS identifies that RBs 0 and 1 of UL narrowband region 1252 are unavailable for the UE because RBs 0 and 1 are included in reserved portion 1272.

At block 1306, the BS provides an indication of the identified set of resources to the UE. Continuing the example above, the BS sends a PDCCH to the UE indicating that RBs 0 and 1 of narrowband region 1252 are unavailable for the UE and scheduling the UE to send a PUSCH to the BS using narrowband region 1252.

Operation 1300 continues at block 1308, wherein the BS communicates with the UE using the narrowband regions. Continuing the example above, the BS receives a PUSCH from the UE that occupies RBs 2-5 of narrowband region 1252.

Figure 14:
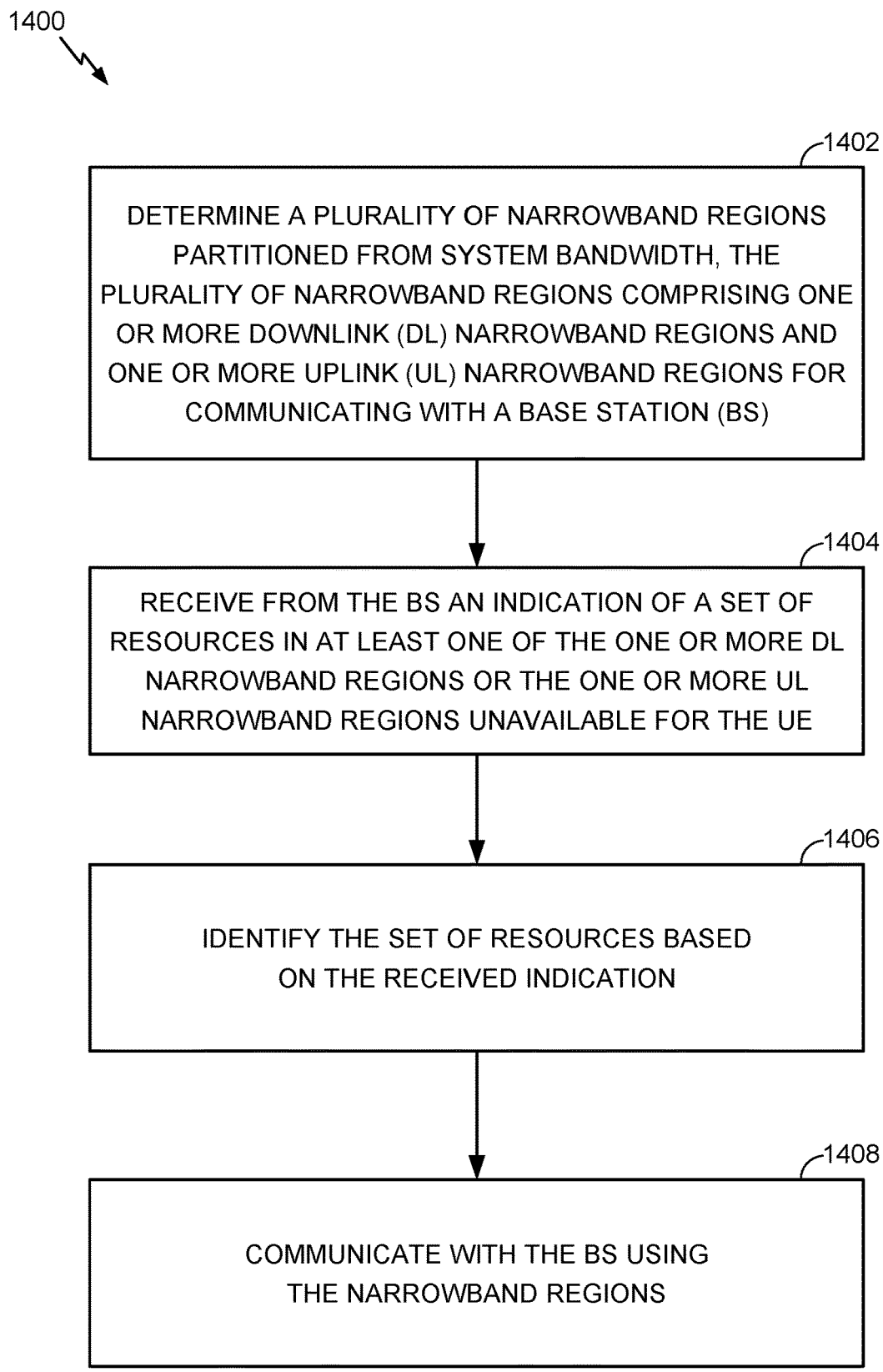
FIG. 14 illustrates an exemplary operation for wireless communications that may be performed by a UE, in accordance with certain aspects of the present disclosure.

FIG. 14 illustrates example operation 1400 for wireless communications that may be performed by a UE (e.g., UE 120*a* in FIG. 1), according to aspects of the present disclosure. The operation 1400 may be performed by an MTC UE, for example, being served by a cell using one of the exemplary techniques of reserving transmission resources illustrated in FIG. 12. The operation 1400 may be complementary to operation 1300.

Operation 1400 begins at block 1402, wherein the UE determines a plurality of narrowband regions partitioned from system bandwidth, the plurality of narrowband regions comprising one or more downlink (DL) narrowband regions and one or more uplink (UL) narrowband regions for communicating with a base station (BS). The UE may determine the DL and UL narrowband regions by, for example, decoding a control channel from the BS. Continuing the example above and with reference to FIG. 12, a UE may determine a DL narrowband region (not shown) from a DL system bandwidth and an UL narrowband region 1252 from an UL system bandwidth of 10 MHz or 50 RBs for communicating with a BS (e.g., eNB 110*a* in FIG. 1).

Operation 1400 continues at block 1404, wherein the UE receives from the BS an indication of a set of resources in at least one of the one or more DL narrowband regions or the one or more UL narrowband regions unavailable for the UE. Continuing the example above with reference to FIG. 12, the UE receives a PDCCH from the BS indicating that RBs 0 and 1 of UL narrowband region 1252 are unavailable for the UE and scheduling the UE to send a PUSCH to the BS using narrowband region 1252.

At block 1406, the UE identifies the set of resources based on the received indication. Continuing the example above, the UE identifies that RBs 0 and 1 of narrowband region 1252 are unavailable for the UE.

Operation 1400 continues at block 1408, wherein the UE communicates with the BS using the narrowband regions. Continuing the example above, the UE transmits a PUSCH to the BS that occupies RBs 2-5 of narrowband region 1252.

A cell serving MTC and non-MTC UEs may assign some transmission resources for sounding reference signal (SRS) transmission. However, current (e.g., Rel-12) SRS may be transmitted on a group of four consecutive resource blocks, while narrowband regions organized in a system bandwidth may each be a group of six consecutive resource blocks. According to aspects of the present disclosure, a cell serving MTC and non-MTC UEs may multiplex sounding reference signal (SRS) resources for MTC and non-MTC UEs in a code division multiplexing (CDM) manner. As an example, SRS may be transmitted on resources assigned from the system bandwidth in such a manner that each SRS is within a narrowband region.

According to aspects of the present disclosure, MTC SRS locations in a narrowband region may be assigned while considering the narrowband region location within the system bandwidth and cell-specific SRS bandwidth and locations. Considering the narrowband region location within the system bandwidth and the cell-specific SRS bandwidth and locations, while assigning SRS locations to MTC UEs, may allow MTC UEs to transmit SRS that are orthogonal (e.g., differentiable by codes in the SRS) to SRS transmitted by legacy UEs. SRS in the narrowband may align with the cell SRS boundary, instead of with the start of the narrowband region. For example, in a fifty RB wide system bandwidth with eight narrowband regions and a forty RB wide cell-specific SRS bandwidth located in the center of the system bandwidth, if SRS to be transmitted by MTC UEs are four RBs in bandwidth, the SRS location in each NB may be: no SRS in NB1 and NB8; SRS on RBs 2-5 of NB2, NB4, and NB6; and SRS on RBs 0-3 of NB3, NB5, and NB7.

Figure 15:
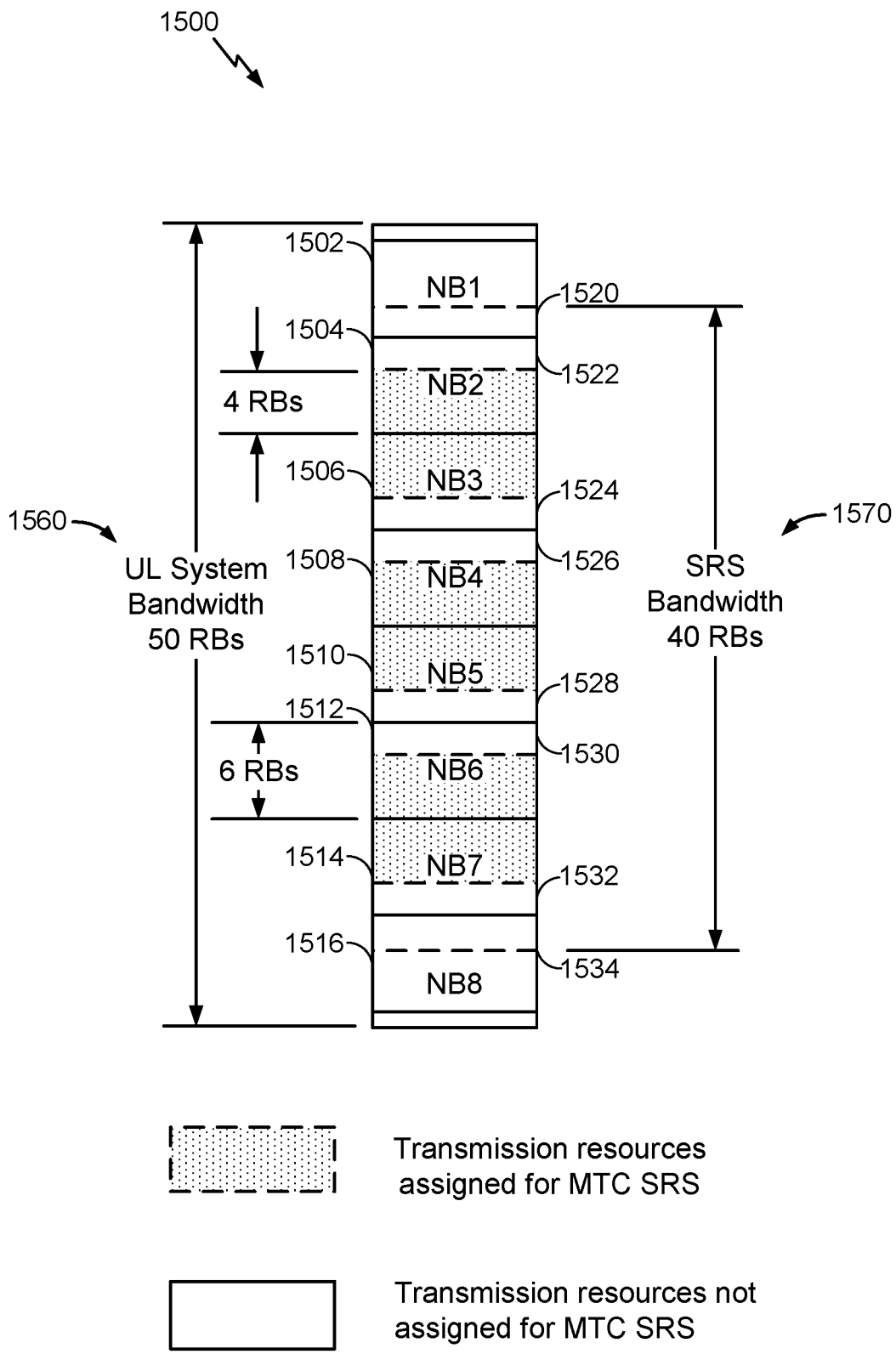
FIG. 15 illustrates an exemplary technique for assignment of transmission resources, in accordance with certain aspects of the present disclosure.

FIG. 15 illustrates an exemplary technique 1500 for assignment of transmission resources for MTC SRS in an UL system bandwidth that has been organized into narrowband regions, e.g., as described above with reference to FIGS. 7-8 and 11-12. In the exemplary technique, a BS serving a cell has organized a fifty RB wide UL system bandwidth 1560 in the cell into eight narrowband regions 1502, 1504, 1506, 1508, 1510, 1512, 1514, 1516. The BS has also determined (e.g., based on a network specification or a system operator configuration) that UEs served by the cell should transmit SRS in a forty RB wide SRS bandwidth 1570 located in the center of the system bandwidth. The BS assigns RBs 2-5 (the lower four RBs of a six RB narrowband region) of each of narrowband regions 1504, 1508, and 1512 for transmission of SRS by an MTC UE assigned to use one of those narrowband regions. The BS also assigns RBs 0-3 (the upper four RBs of a six RB narrowband region) of each of narrowband regions 1506, 1510, and 1514 for transmission of SRS by an MTC UE assigned to use one of those narrowband regions. The BS does not assign any RBs for transmission of SRS in narrowband regions 1502 and 1516.

According to aspects of the present disclosure, a BS may indicate that UEs using the narrowband regions should also transmit two RB wide SRS in portions 1520, 1522, 1524, 1526, 1528, 1530, 1532, 1534 of the SRS bandwidth (e.g., the forty RB wide SRS bandwidth in FIG. 15) that are not assigned to transmission of four RB wide SRS. The two RB wide SRS may be transmitted by UEs using narrowband regions 1502 or 1516 as well as 1504 through 1514. The two RB wide SRS may not be orthogonal to legacy four RB wide SRS, but the lack of orthogonality may be irrelevant in some situations (e.g., when no non-MTC UE is transmitting an SRS).

Figure 16:
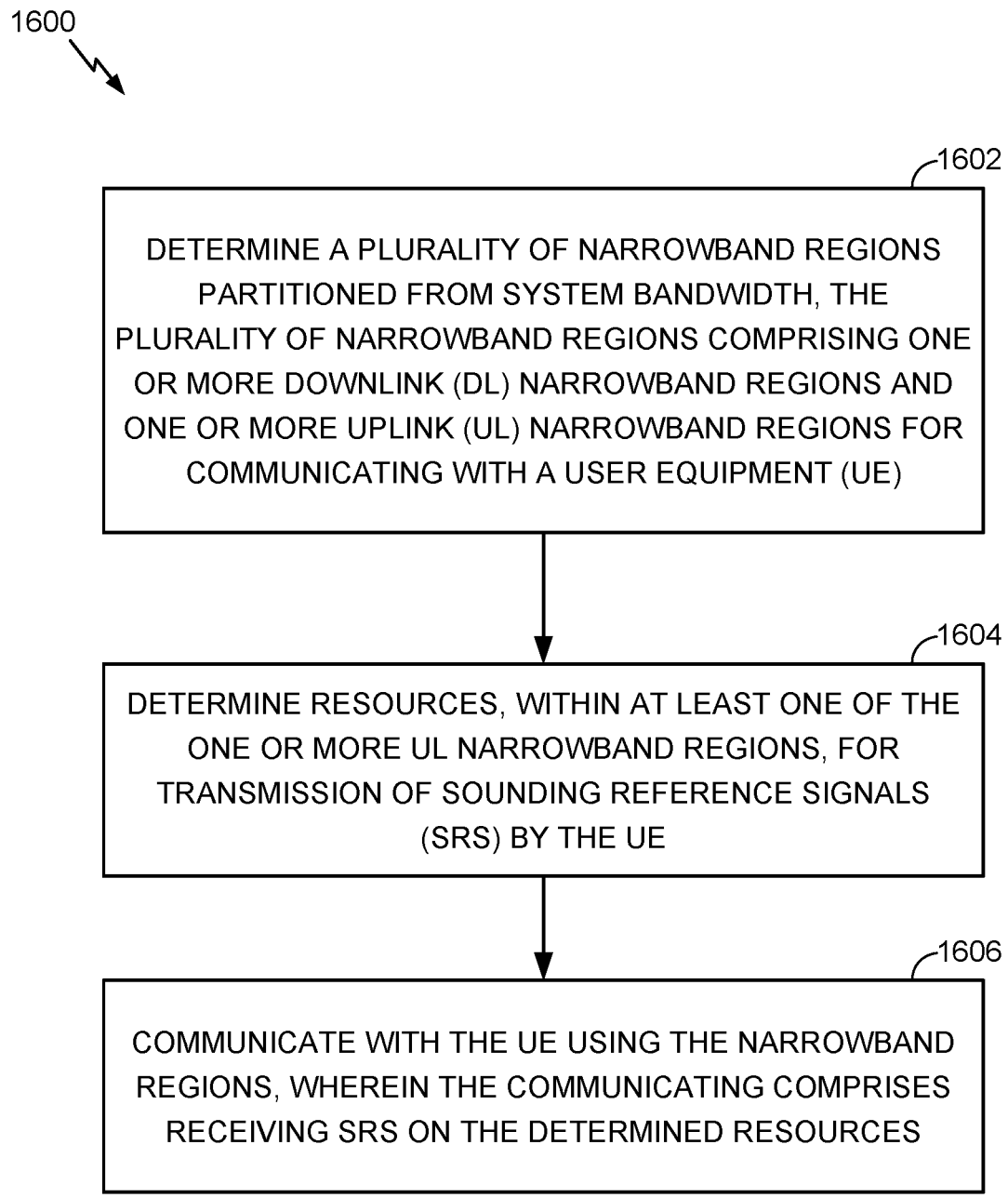
FIG. 16 illustrates an exemplary operation for wireless communications that may be performed by a BS, in accordance with certain aspects of the present disclosure.

FIG. 16 illustrates example operation 1600 for wireless communications that may be performed by a BS (e.g., eNodeB 110*a* in FIG. 1), according to aspects of the present disclosure. The operation 1600 may be performed by a BS to support MTC UEs, and may use one of the exemplary techniques of assigning transmission resources for MTC SRS illustrated in FIG. 15.

Operation 1600 begins at block 1602, wherein the BS determines a plurality of narrowband regions partitioned from system bandwidth, the plurality of narrowband regions comprising one or more downlink (DL) narrowband regions and one or more uplink (UL) narrowband regions for communicating with a user equipment (UE). The BS may determine the DL and UL narrowband regions by, for example, performing a scheduling algorithm. For example and with reference to FIG. 15, a BS may determine a DL narrowband region (not shown) from a DL system bandwidth and an UL narrowband region 1504 from an UL system bandwidth 1560 of 10 MHz or 50 RBs for communicating with a UE (e.g., UE 120*a* in FIG. 1).

Operation 1600 continues at block 1604, wherein the BS determines resources, within at least one of the one or more UL narrowband regions, for transmission of sounding reference signals (SRS) by the UE. Continuing the example above with reference to FIG. 15, the BS determines that RBs 2-5 of UL narrowband region 1504 are for transmission of SRS by the UE.

At block 1606, the BS communicates with the UE using the at least one of the one or more narrowband regions, wherein the communicating comprises receiving SRS on the determined resources. Continuing the example above, the BS receives transmission from the UE in narrowband region 1504 including SRS in RBs 2-5 of narrowband region 1504.

Figure 17:
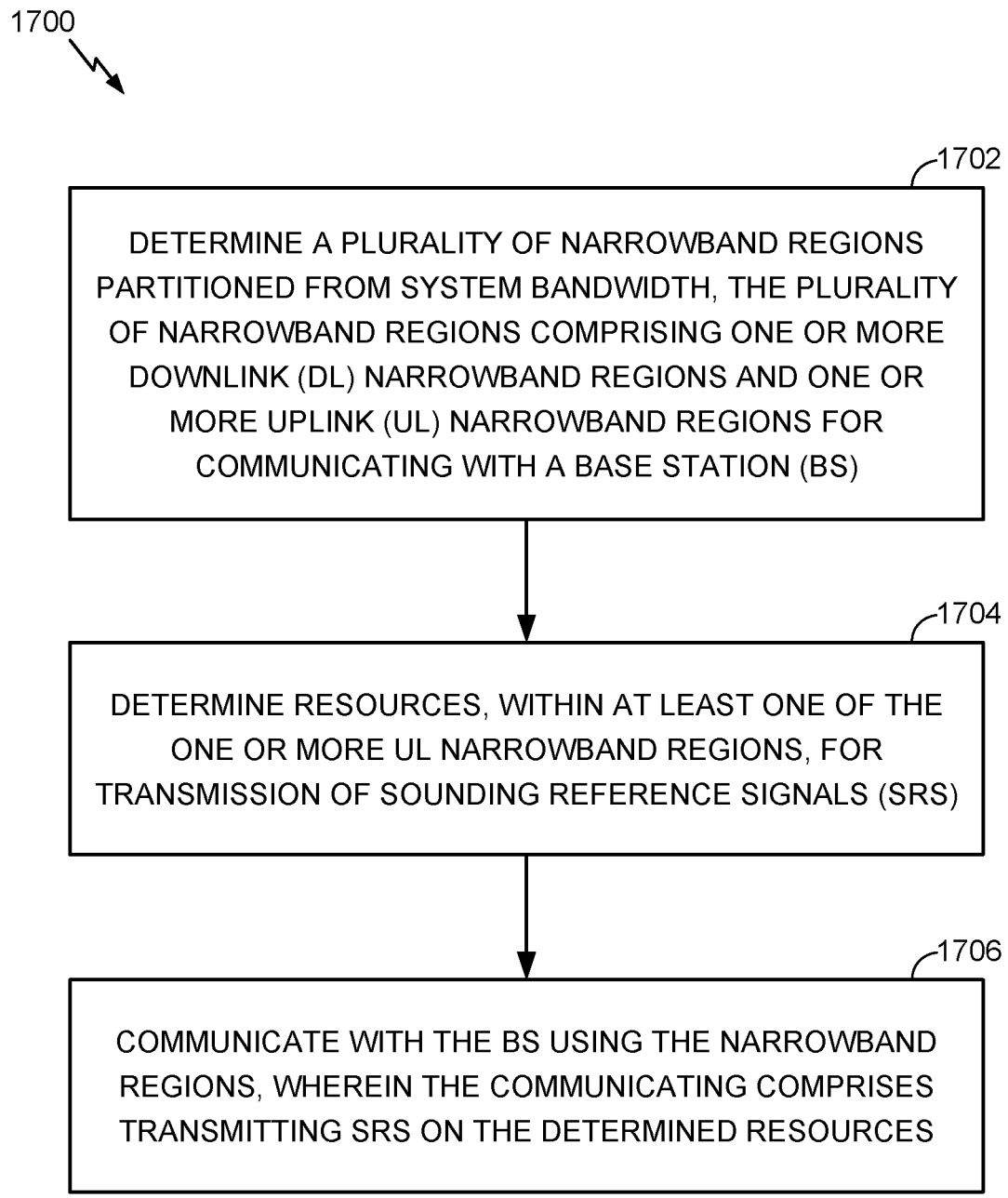
FIG. 17 illustrates an exemplary operation for wireless communications that may be performed by a UE, in accordance with certain aspects of the present disclosure.

FIG. 17 illustrates example operation 1700 for wireless communications that may be performed by a UE (e.g., UE 120a in FIG. 1), according to aspects of the present disclosure. The operation 1700 may be performed by an MTC UE, for example, being served by a cell using one of the exemplary techniques of assigning transmission resources for MTC SRS illustrated in FIG. 15. The operation 1700 may be complementary to operation 1600.

Operation 1700 begins at block 1702, wherein the UE determines a plurality of narrowband regions partitioned from system bandwidth, the plurality of narrowband regions comprising one or more downlink (DL) narrowband regions and one or more uplink (UL) narrowband regions for communicating with a base station (BS). The UE may determine the DL and UL narrowband regions by, for example, decoding a control channel from the BS. Continuing the example above and with reference to FIG. 15, a UE may determine a DL narrowband region (not shown) from a DL system bandwidth and an UL narrowband region 1504 from an UL system bandwidth 1560 of 10 MHz or 50 RBs for communicating with a BS (e.g., eNB 110a in FIG. 1).

Operation 1700 continues at block 1704, wherein the UE determines resources, within at least one of the one or more UL narrowband regions, for transmission of sounding reference signals (SRS). Continuing the example above with reference to FIG. 15, the UE determines that RBs 2-5 of UL narrowband region 1504 are for transmission of SRS.

At block 1706, the UE communicates with the BS using the at least one of the one or more narrowband regions, wherein the communicating comprises transmitting SRS on the determined resources. Continuing the example above, the UE sends transmission including SRS in RBs 2-5 of narrowband region 1504.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. Software shall be construed broadly to mean instructions, data, code, or any combination thereof, whether referred to as software, firmware, middleware, code, microcode, hardware description language, machine language, or otherwise. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

For example, means for determining may include one or more processors, such as the receive processor 258, the controller/processor 280, transmit processor 264 and/or other processors and modules of the UE 120 illustrated in FIG. 2. Means for receiving or communicating may include a receive processor (e.g., the receive processor 258) and/or an antenna(s) 252 of the UE 120 illustrated in FIG. 2. Means for transmitting or communicating may comprise a transmit processor (e.g., the transmit processor 220) and/or an antenna(s) 234 of the eNB 110 illustrated in FIG. 2. Means for indicating may include one or more processors, such as the transmit processor 220, the controller/processor 240 and/or other processors and modules of the eNB 110 illustrated in FIG. 2.

In one or more exemplary designs, the functions described may be implemented in hardware, software or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for wireless communications by a user equipment (UE), comprising:
   determining a plurality of narrowband regions partitioned from system bandwidth, the plurality of narrowband regions comprising one or more downlink (DL) narrowband regions and one or more uplink (UL) narrowband regions for communicating with a base station (BS);

determining resources, within the one or more UL narrowband regions, for transmission of sounding reference signals (SRS), a location of the resources, within the one or more UL narrowband region, for transmission of the SRS by the UE is based on a location of the UL narrowband region within the system bandwidth, wherein determining resources includes determining no resources for the transmission of the SRS in one or more of the UL narrowband regions; and communicating with the BS using the narrowband regions, wherein the communicating comprises transmitting the SRS on the determined resources.

2. The method of claim 1, wherein the location of resources within the UL narrowband region is also based on a cell-specific SRS bandwidth.

3. The method of claim 1, wherein the determination of resources for transmission of SRS comprises:

determining a first location of resources for transmission of SRS for a first set of one or more UL narrowband regions; and determining a second location of resources for transmission of SRS for a second set of one or more UL narrowband regions.

4. A method for wireless communications by a base station (BS), comprising:

determining a plurality of narrowband regions partitioned from system bandwidth, the plurality of narrowband regions comprising one or more downlink (DL) narrowband regions and one or more uplink (UL) narrowband regions for communicating with a user equipment (UE);

determining resources, within the one or more UL narrowband regions, for transmission of sounding reference signals (SRS) by the UE, a location of the resources, within the one or more UL narrowband region, for transmission of the SRS by the UE is based on a location of the UL narrowband region within the system bandwidth, wherein determining resources includes determining no resources for the transmission of the SRS in one or more more of the UL narrowband regions; and communicating with the UE using the narrowband regions, wherein the communicating comprises receiving SRS on the determined resources.

5. The method of claim 4, wherein a location of resources, within an UL narrowband region, for transmission of SRS by the UE is based on a location of the one or more UL narrowband regions within system bandwidth.

6. The method of claim 4, wherein the location of resources within the one or more UL narrowband regions is also based on a cell-specific SRS bandwidth.

7. The method of claim 4, wherein the determination of resources for transmission of SRS comprises:

determining a first location of resources for transmission of SRS for a first set of one or more UL narrowband regions; and determining a second location of resources for transmission of SRS for a second set of one or more UL narrowband regions.

8. An apparatus for wireless communications, comprising:

a processor configured to:

determine a plurality of narrowband regions partitioned from system bandwidth, the plurality of narrowband regions comprising one or more downlink (DL) narrowband regions and one or more uplink (UL) narrowband regions for communicating with a base station (BS);

determine resources, within the one or more UL narrowband regions, for transmission of sounding reference signals (SRS), a location of the resources, within the one or more UL narrowband region, for transmission of the SRS by the UE is based on a location of the UL narrowband region within the system bandwidth, wherein determine resources includes determine no resources for the transmission of the SRS in one or more of the UL narrowband regions; and communicate with the BS using the narrowband regions, wherein the communicating with the BS comprises transmitting the SRS on the determined resources; and a memory coupled with the processor.

9. The apparatus of claim 8, wherein the processor is configured to determine the location of the resources within the UL narrowband region further based on a cell-specific SRS bandwidth.

10. The apparatus of claim 8, wherein the processor is configured to determine the resources for transmission of the SRS by:

determining a first location of the resources for transmission of the SRS for a first set of one or more UL narrowband regions; and determining a second location of the resources for transmission of the SRS for a second set of one or more UL narrowband regions.

11. An apparatus for wireless communications, comprising:

a processor configured to:

determine a plurality of narrowband regions partitioned from system bandwidth, the plurality of narrowband regions comprising one or more downlink (DL) narrowband regions and one or more uplink (UL) narrowband regions for communicating with a user equipment (UE);

determine resources, within the one or more UL narrowband regions, for transmission of sounding reference signals (SRS) by the UE, a location of the resources, within the one or more UL narrowband region, for transmission of the SRS by the UE is based on a location of the UL narrowband region within the system bandwidth, wherein determine resources includes determine no resources for the transmission of the SRS in one or more of the UL narrowband regions; and communicate with the UE using the narrowband regions, wherein communicating with the UE comprises receiving SRS on the determined resources; and a memory coupled with the processor.

12. The apparatus of claim 11, wherein the processor is configured to determine the location of the resources within the one or more UL narrowband regions further based on a cell-specific SRS bandwidth.

13. The apparatus of claim 11, wherein the processor is configured to determine the resources for transmission of the SRS by:

determining a first location of the resources for transmission of the SRS for a first set of one or more UL narrowband regions; and determining a second location of the resources for transmission of the SRS for a second set of one or more UL narrowband regions.

\* \* \* \* \*